(12) United States Patent
Paraschivescu

(10) Patent No.: US 10,019,144 B2
(45) Date of Patent: Jul. 10, 2018

(54) ORGANIZER FOR DATA THAT IS SUBJECT TO MULTIPLE CRITERIA

(71) Applicant: Quick Eye Technologies Inc., Chicago, IL (US)

(72) Inventor: Andrei Paraschivescu, Chicago, IL (US)

(73) Assignee: Quick Eye Technologies Inc., Chicago, IL (US)

( * ) Notice: Subject to any disclaimer, the term of this patent is extended or adjusted under 35 U.S.C. 154(b) by 316 days.

(21) Appl. No.: 14/768,149

(22) PCT Filed: Feb. 14, 2014

(86) PCT No.: PCT/US2014/016606
§ 371 (c)(1),
(2) Date: Aug. 14, 2015

(87) PCT Pub. No.: WO2014/127293
PCT Pub. Date: Aug. 21, 2014

(65) Prior Publication Data
US 2015/0378582 A1  Dec. 31, 2015

Related U.S. Application Data

(60) Provisional application No. 61/765,547, filed on Feb. 15, 2013.

(51) Int. Cl.
*G06F 3/048* (2013.01)
*G06F 3/0484* (2013.01)
*G06F 17/30* (2006.01)

(52) U.S. Cl.
CPC ...... *G06F 3/04847* (2013.01); *G06F 3/04842* (2013.01); *G06F 17/30994* (2013.01); *G06F 3/048* (2013.01)

(58) Field of Classification Search
CPC .................................................. G06F 3/048
USPC ............................................................ 715/771
See application file for complete search history.

(56) References Cited

U.S. PATENT DOCUMENTS 6,629,097 B1 *  9/2003  Keith ................ G06F 17/30598
7,945,658 B1     5/2011  Nucci et al.
8,078,966 B2 * 12/2011  Audet ................ G06F 17/2205
                                                              715/273

(Continued)

OTHER PUBLICATIONS

Thomas, Shane, Authorized Officer, ISA/US, International Search Report and Written Opinion, International Application No. PCT/US14/16606, dated Aug. 28, 2014, 11 pages.

Primary Examiner — William Titcomb
(74) Attorney, Agent, or Firm — Perkins Coie LLP

(57) ABSTRACT

A user interface includes a first display area which includes a first control widget representative of a first attribute group and a second control widget representative of the second attribute group, and a second display area in which a first measure of a first portion of a plurality of data items can be displayed in response to a user activating the first control widget. A first classification attribute from a first attribute group and a second classification attribute from a second attribute group are associated with each data item of the plurality of data items. A multi-description is generated for each data item, the multi-description including a list of pairs of the first classification attribute and the second classification attribute.

27 Claims, 37 Drawing Sheets

(56) References Cited

U.S. PATENT DOCUMENTS

| | | | |
|---|---|---|---|
| 8,280,880 B1* | 10/2012 | Aymeloglu | G06F 17/30398 707/726 |
| 8,499,243 B2* | 7/2013 | Yuki | G06F 3/04817 715/735 |
| 9,367,196 B1* | 6/2016 | Goldstein | G06F 3/048 |
| 9,672,478 B2* | 6/2017 | B'Far | G06Q 10/00 |
| 9,716,764 B2* | 7/2017 | Brezina | H04L 67/22 |
| 2004/0100479 A1* | 5/2004 | Nakano | G06F 1/1626 715/700 |
| 2005/0114763 A1 | 5/2005 | Nonomura et al. | |
| 2008/0205403 A1 | 8/2008 | Akyol et al. | |
| 2009/0031244 A1* | 1/2009 | Brezina | H04M 15/00 715/781 |
| 2009/0187533 A1 | 7/2009 | Butler et al. | |
| 2010/0218134 A1* | 8/2010 | B'Far | G06Q 10/00 715/780 |
| 2010/0293190 A1* | 11/2010 | Kaiser | G06F 3/048 707/769 |
| 2011/0202866 A1* | 8/2011 | Huang | G06F 3/0482 715/779 |
| 2011/0202883 A1 | 8/2011 | Oh et al. | |
| 2011/0238691 A1* | 9/2011 | Gere | G06F 3/0482 707/769 |
| 2012/0030646 A1* | 2/2012 | Ravindran | G06F 8/34 717/105 |
| 2012/0179633 A1 | 7/2012 | Ghani et al. | |
| 2012/0284670 A1* | 11/2012 | Kashik | G06F 17/30994 715/848 |
| 2013/0212487 A1* | 8/2013 | Cote | G06F 9/451 715/745 |

\* cited by examiner

ORGANIZER FOR DATA THAT IS SUBJECT TO MULTIPLE CRITERIA

CROSS REFERENCE TO RELATED APPLICATION

This patent document is a 35 U.S.C. § 371 National Stage application of PCT Application No. PCT/US2014/016606, filed on Feb. 14, 2014, which further claims the benefits and priority of prior U.S. Provisional Patent Application No. 61/765,547, filed on Feb. 15, 2013. The entire disclosures of the above applications are incorporated by reference in their entirety as part of this document.

BACKGROUND

The amount of data that can be processed and stored by one or more computers has grown multi-fold over the last few years. The explosive growth in the data managed and processed by computers can be witnessed in application areas such as web servers, e-commerce servers, financial databases, multimedia content servers, and so on.

SUMMARY

The present document describes techniques for organizing display of large, complex data to a user. A user is able to navigate through data by applying various data classification criteria. After the application of a category, the data display can be updated in vertical or horizontal directions to display an attribute of the data that meets the applied criterion.

In one aspect, techniques are provided for displaying data to a user. The data is made up of a plurality of data items. A first classification attribute from a first attribute group and a second classification attribute from a second attribute group are associated with each data item. A multi-description is generated for each data item. The multi-description includes a list of pairs of the first attribute and the second attribute for each data item. A user interface is provided. The user interface comprises a first display area including a first control widget representative of the first attribute group and a second control widget representative of the second attribute group. The user interface includes a second display area in which a first measure of a first portion of the plurality of data items can be displayed in response to a user activating the first control widget.

In another aspect, techniques are provided for enabling browsing of data subject to a plurality of classification characteristics. User inputs that prioritize the plurality of classification characteristics are received. Data is displayed in a tabular form comprising nested tables based on the received plurality of criteria such that a table corresponding to a first priority classification characteristic is displayed to fit within a display area of another table corresponding to a second priority classification characteristic when the second priority is at a priority level that is a higher priority level than the first priority classification characteristic.

In yet another aspect, a database navigation process that utilizes direction-sensitive navigation control icons is disclosed. A database of data items in which each data item is characterized by a plurality of criteria and each criterion is characterized by a plurality of categories is accessed. A plurality of navigation icons for navigating the database are provided, each navigation icon being associated with a criteria. In response to a user activating a first navigation icon in a first direction, a graphical user interface is updated to display a first plurality of data items characterized by a first criterion associated the first navigation icon and further updating the updated GUI in response to the user activating a second navigation icon in a second direction, to display a second plurality of data items characterized by the first criterion and a second criterions associated with the second navigation icon.

In yet another aspect, an apparatus includes an instruction storage memory and a processor that executes the instructions to implement a method of generating human readable display from items of data. generating one or more hierarchies of categories for the items of data. computing an aggregate representation from the items of data, displaying, in a parent display, the one or more hierarchies of categories and a description of the aggregate representation, assigning a given one of the one or more hierarchies to the displayed aggregate representation by dropping a control widget corresponding to the given hierarchy on the display of the aggregate representation calculating sub-aggregates for the aggregate representation; arranging the calculated sub-aggregates in a visual format by expanding the parent display to retain previously displayed information and further displaying the visual format of the calculated sub-aggregates.

The details of above aspects and their implementations are set forth in the accompanying drawings, the description and the claims.

BRIEF DESCRIPTION OF THE DRAWINGS

FIG. 3 is another example of a data browsing GUI.
FIG. 4 is another example of a data browsing GUI.
FIG. 5 is another example of a data browsing GUI.
FIG. 7 is another example of a data browsing GUI.

DETAILED DESCRIPTION

Figure 1:
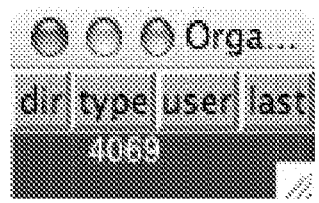
FIG. 1 is a screen shot of a data browsing graphical user interface (GUI).

Examples and implementations of techniques are provided for organizing data that includes multiple related records, and presenting the data according to a user's viewing choices. In some disclosed embodiments, data is classified using two or more hierarchical classifications. A user is presented with data based on a first level of break down, or data classification, specified by the user. The data thus presented can be further broken down into a second level of break down. In some disclosed implementations, the second level of break down can be accomplished either in a horizontal direction on a graphical user interface (GUI) or in a vertical direction on the GUI. The software tool that enables the above functions for browsing large sets of data based on multiple criteria is referred to as an Organizer.

Techniques are disclosed to simplify the task of browsing through large sets of data items. The disclosed graphical tool combines the visual and interactive advantages of tree and table displays. Visual cues are provided to a user to help with browsing of data on a computer platform that includes a processor and a display.

Large quantities of data, including text and numbers, can be presented as expandable lists (sometimes called trees) in which a list can be condensed to a top level headers (e.g., for a Microsoft Word file in the "document map" format). The top level headers can be individually expanded to reveal additional data, which is further expandable to additional levels. While the expandable lists offer a convenient way to manage data complexity by allowing a user to selectively zoom into data, such data expansion is limited to opening/closing additional data underneath a level in a single direction (typically vertical). Furthermore there is no provision to apply multiple different classifications to achieve expansion of a list. When a user action desires expanding/collapsing data below a certain level, the additional data includes data that fits one category only. It is not possible in various existing, conventional or other software systems to achieve the expansion/collapsing based on multiple data attributes.

Complex data can also be presented to a user using a technique that is sometimes called "a pivot table." A pivot table can automatically sort, count, total or give the average of the data stored in one table or spreadsheet and display the results in the form of a second table called a pivot table. However, the depth of data sorting, or the level to which a user can dive into data, is only one layer deep in the pivot table technology.

With the emergence of complex computer systems and storage devices that can store large amounts of data, there is an ever-growing need for data classification, sorting and presentation to a user. The traditional tree/pivot table techniques fall short of addressing today's needs to be able to classify and present large quantities of data efficiently.

Described in this document are, among other things, examples of implementations of the described techniques are disclosed for organizing, categorizing and displaying data to a user. The disclosed techniques can be implemented on a user's computer, at a web server, or any other user device such as a tablet, a smartphone, a notebook computer, etc.

As a non-limiting example, in some implementations, the disclosed technology could be used at a e-commerce server that offers thousands of catalog items for sale. Using the disclosed techniques, e.g., a user accessing the e-commerce server over the Internet, may be able to quickly sort through available merchandise using applying multiple classifications.

As another non-limiting example, in some implementations, an individual investor, or an investment professional, may be able to sort through financial data using various search criteria (e.g., price to earnings ratio, closing stock price, profit growth, market cap value etc.), by applying these criteria to a database of financial data.

Visually browsing large sets of data items is commonly performed. Just a few examples are: files on a computer, articles for sale on an online retailer's web-site, a person's credit card transactions for the past year, a factory's inventory. While database systems are a common solution for storing and querying data, presenting information in human readable form is a different task.

Two common ways to visualize data items are "tree+filter" and table. An example of "tree+filter" is browsing items on an online store: products are grouped by nested categories, and the view can be restricted by using various criteria. For a table display, each line and column represents a category, and the table shows some information regarding the items that match each line and column combination. Both ways can be unsatisfactory, particularly for large, complex sets of items.

Many limitations of current displays stem from giving some criteria preferential treatment, which often leads to relying primarily on one visual format. Computer files e.g. are easier to see by location than by other characteristics, and are not commonly shown as a table: it is not known in advance which attributes should be used for rows and columns.

Specifically a graphical tool is provided for browsing data sets subject to any number of criteria. In one aspect, the graphical tool combines the visual and interactive advantages of tree and table displays, and allows the user to break down data by prioritizing criteria himself, with none privileged a priori. Aggregate measures for sets of items matching desired combinations of characteristics are easy to obtain. The disclosed examples for implementing the Organizer pertain to visually browsing data items and include, among others, the following aspects or features, (1) the techniques for data the Organizer works with; (2) user interaction including features of what a display user interface look like, and commands that can be given, and effects of such commands; (3) how a state of the display user interface is represented, either for volatile (memory) or permanent storage (disk or equivalent); and (4) the effect of commands on the display representation.

In the following sections, section numbers are used for the ease of understanding and cross-referencing.

1. Examples of Browsing Data Using Multiple Criteria

The approach relies on combining a number of insights:

Many classification criteria can be manipulated in a uniform way by regarding them as directed graphs, a generalization of tree graphs.

A display composed of nested tables can be kept intelligible with proper formatting (colors, borders, alignment, etc.).

The interaction between data items and visualizations can be simplified by using aggregate measures for subsets of data.

Nested arrays are suitable for representing combinations of directed graphs.

1.1 Criteria and Categories

For understanding the disclosed techniques, one start by analyzing characteristics independently of particular data sets. As it is not practical to enumerate all potential uses, it makes sense to look at a characteristic's intrinsic properties, with the understanding that data may or may not have it. For example, zip codes are applicable primarily to addresses, but things like parks or average daily temperatures possess locations as well; it would be incorrect to assume that zip codes are a characteristic of addresses only. If technically needed, an N/A category can be added to handle items for which the characteristic does not apply.

Zip codes exhibit a common problem: at approximately 43,000 of them, it is hard to make use of one without some looking up. However, zip codes are not random numbers; grouping of them into regions, states, counties, cities etc. can be used to make sure that at every level there are sufficiently few categories. This is helped by the fact that someone who is looking at the sub-categories of Chicago is likely to know what River North is.

Another example of a human-usable characteristic is time. With 2000 years being approximately 63 billion seconds, referring to event times by second alone is feasible for computers, but not humans. The solution is calendars and clocks, based on groupings into centuries, years, months etc. With no group too big, everyone can easily read and understand dates and times.

This grouping approach can be formalized by using directed graphs, a well understood mathematical notion with many applications to computing. A directed graph is a set of vertices, some of them connected by arrows.

Figure 28A:
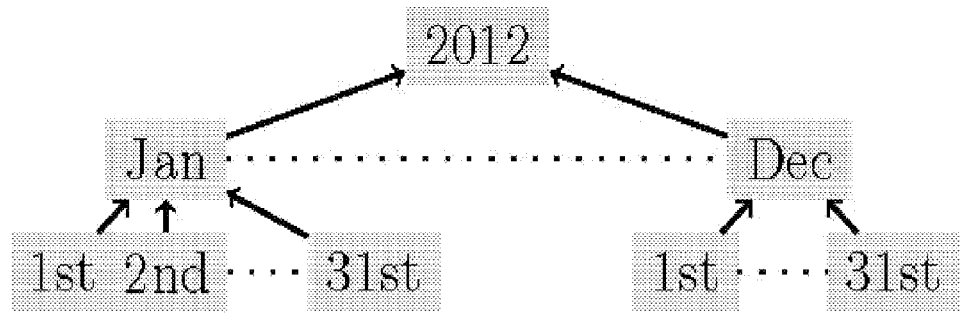
FIGS. 28A, 28B and 28C depict example relationships among data attributes.

For example FIG. 28A, represents a 2012 calendar as a directed graph. The vertices of the graph are referred to as categories and arrows join sub-categories to each parent category. If y can be reached by arrows (perhaps 0) from x, x is said to be narrower than y, and that y is said to be broader than x (by convention x is narrower/broader than itself). For example, Jan 1st is narrower than 2012, without being its sub-category. Finally, the depth of a category is the minimum number of arrows needed to reach the top category.

Figure 28B:
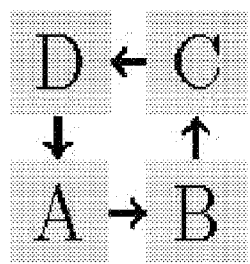

Throughout this description a criterion will refer to a classification characteristic that has been organized as a directed graph. A directed graph has a top category conventionally named all, and that it contains no cycles. Graphs like (FIG. 28B) are disallowed, as they do not model progressively narrower categories useful for classification.

The reader already knows many examples, as tree graphs fit the above requirements, and have the additional property that every category belongs to a unique parent category.

Figure 28C:
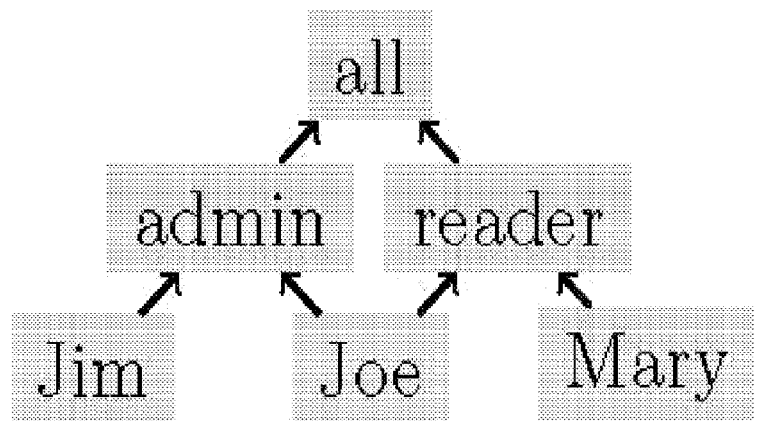

Files organized by directory, dates and times, and zip codes as above, are all trees. Not every criterion is a tree. Consider the classification of users of a website illustrated in FIG. 28C: with Joe both an administrator and a reader, this criterion is not a tree.

Turning a characteristic into a good criterion may benefit from an understanding of its intended use. A representative example is the calendar, which is not just an arbitrary breakdown of seconds, but also relates months to seasons, days to daylight etc. In many cases criteria incorporate domain knowledge and significant work; the Organizer derives value from allowing that work to be easily shared.

1.2 Multi-Descriptions

Some presently disclosed techniques use criteria in combination. A choice of one category from each criterion under consideration will be called a multi-description, and be denoted $\{crit_1: cat_1, crit_2: cat_2, \ldots\}$.

Figure 10:
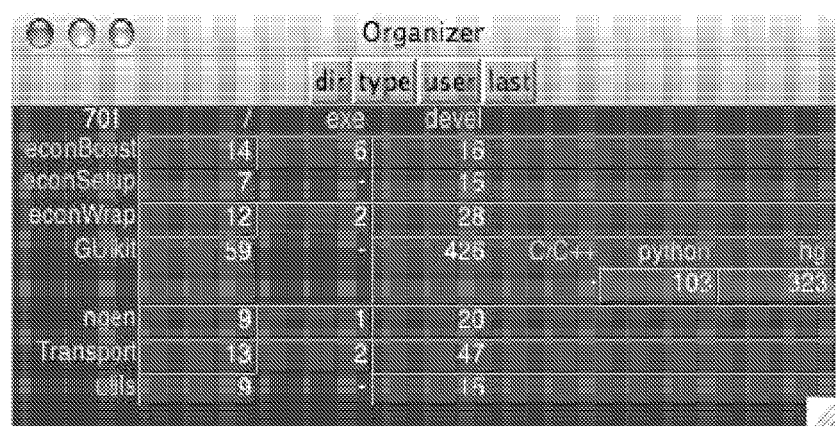
FIG. 10 is another example of a data browsing GUI.
Figure 11:
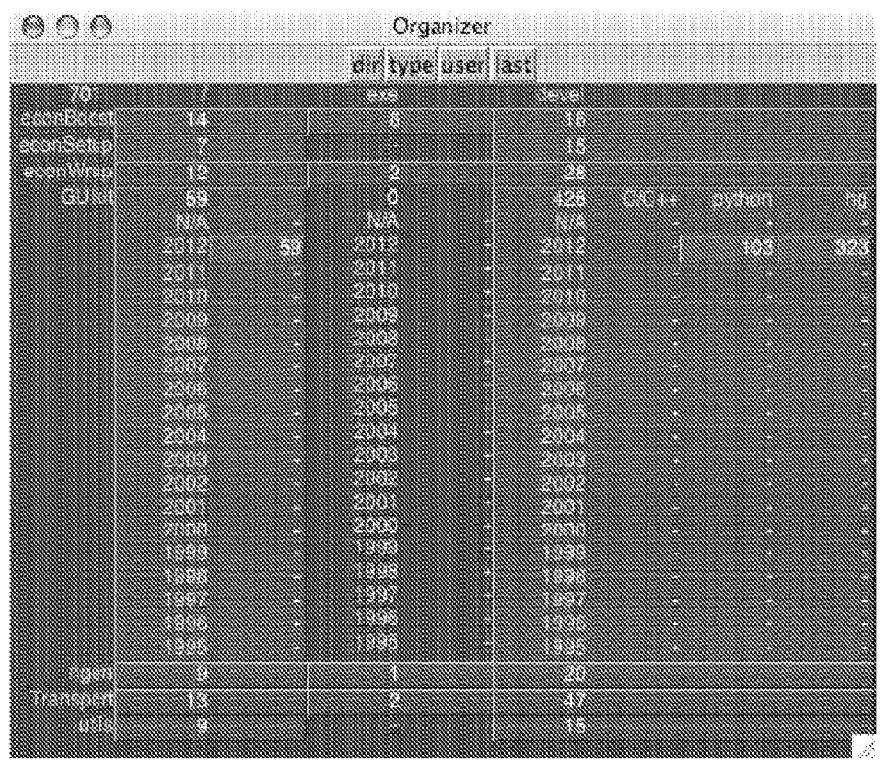
FIG. 11 is another example of a data browsing GUI.
Figure 12:
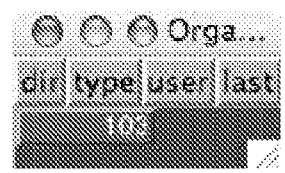
FIG. 12 is another example of a data browsing GUI.
Figure 13:
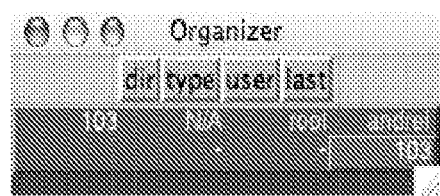
FIG. 13 depicts a GUI control widget.
Figure 14:
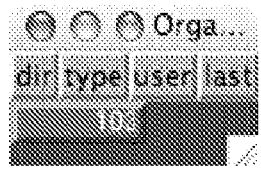
FIG. 14 depicts a GUI control widget.
Figure 15:
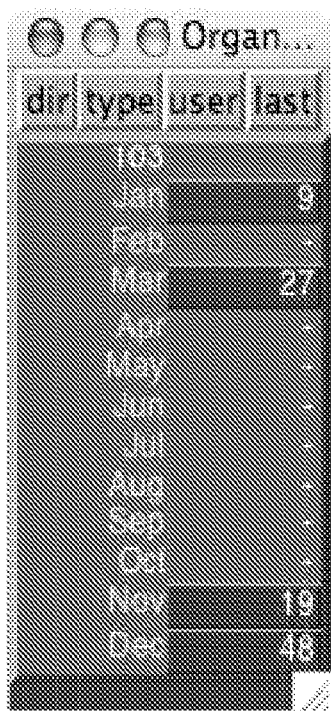
FIG. 15 depicts a GUI control widget.
Figure 16:
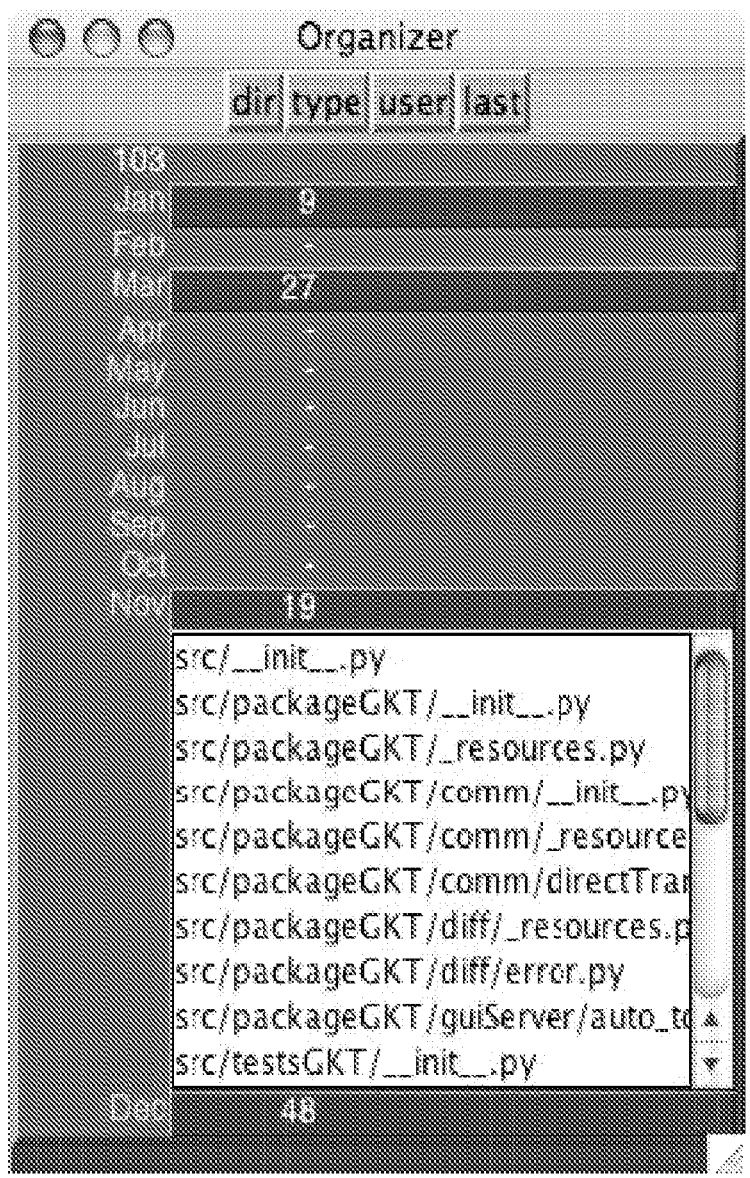
FIG. 16 depicts a GUI that provides visual menu indication to a user.
Figure 17:
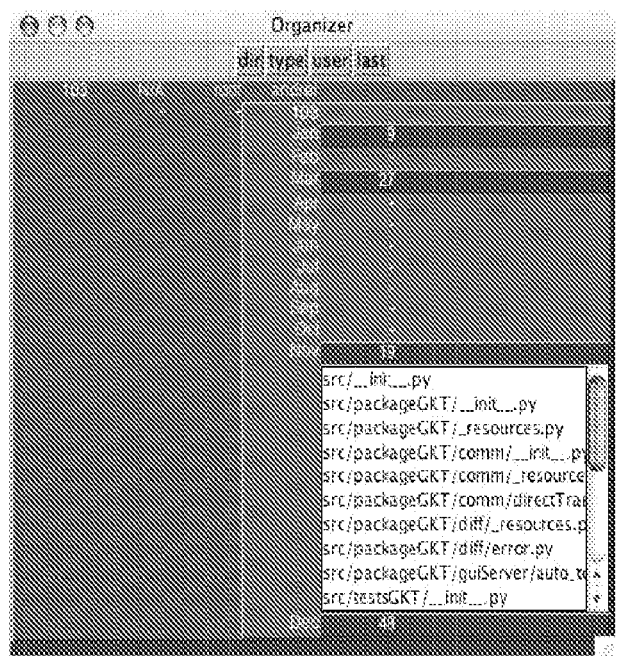
FIG. 17 is another example of a data browsing GUI.
Figure 18:
FIG. 18 is another example of a data browsing GUI.
Figure 19:
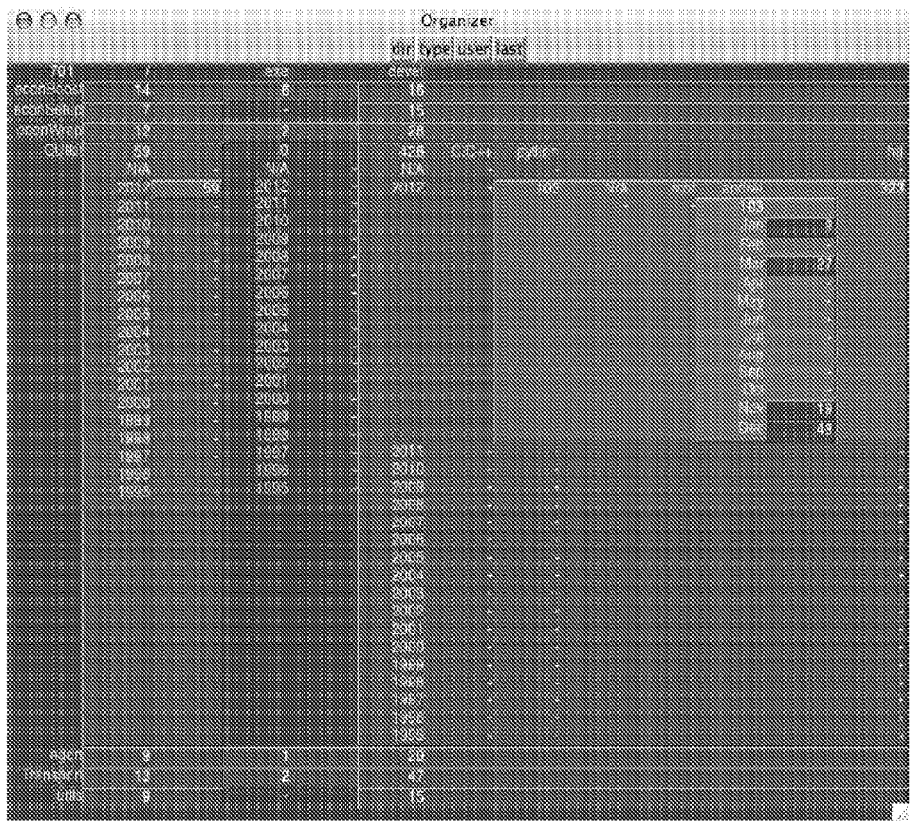
FIG. 19 is another example of a data browsing GUI.
Figure 20:
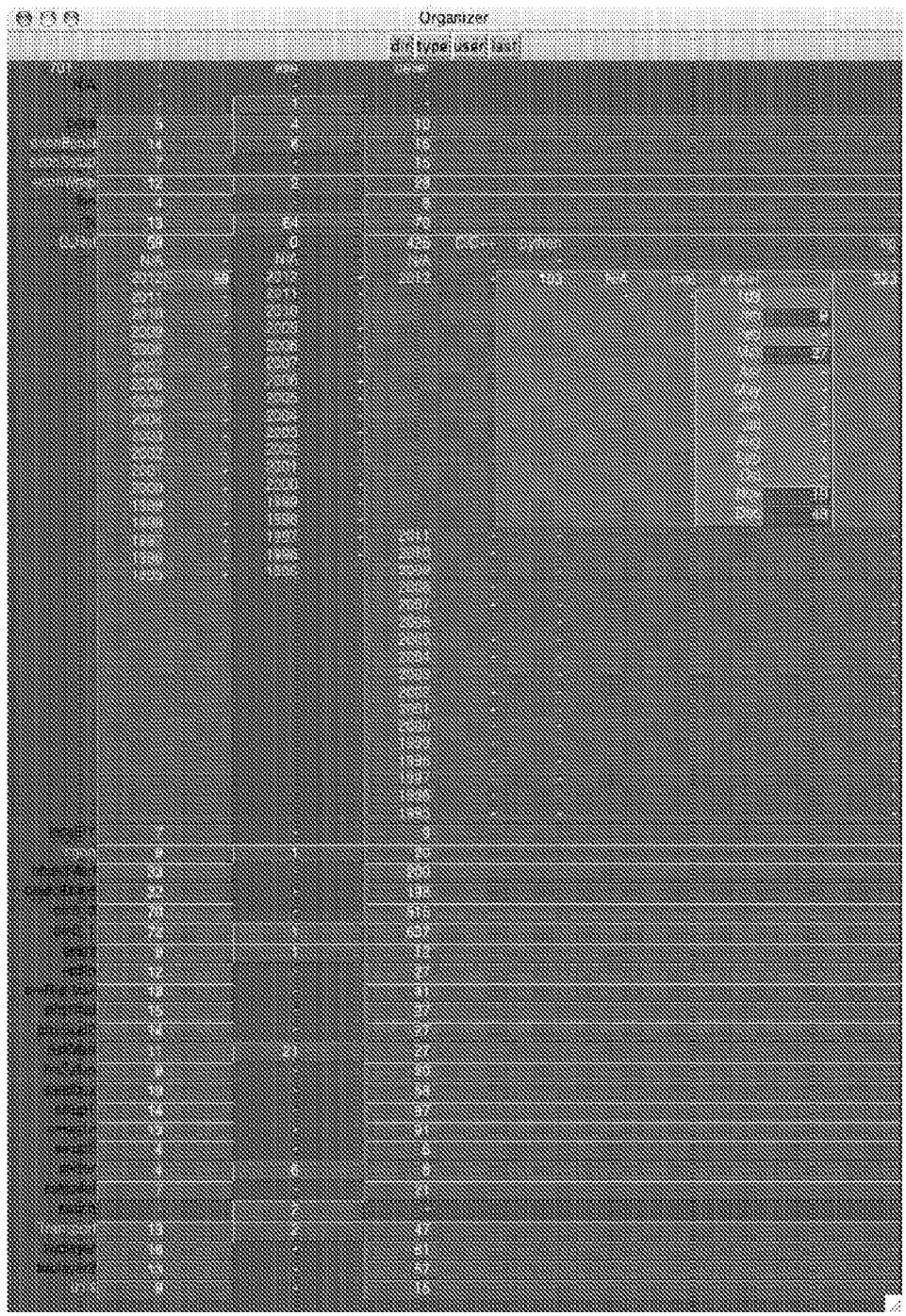
FIG. 20 is another example of a data browsing GUI expanded along multiple directions.
Figure 21:
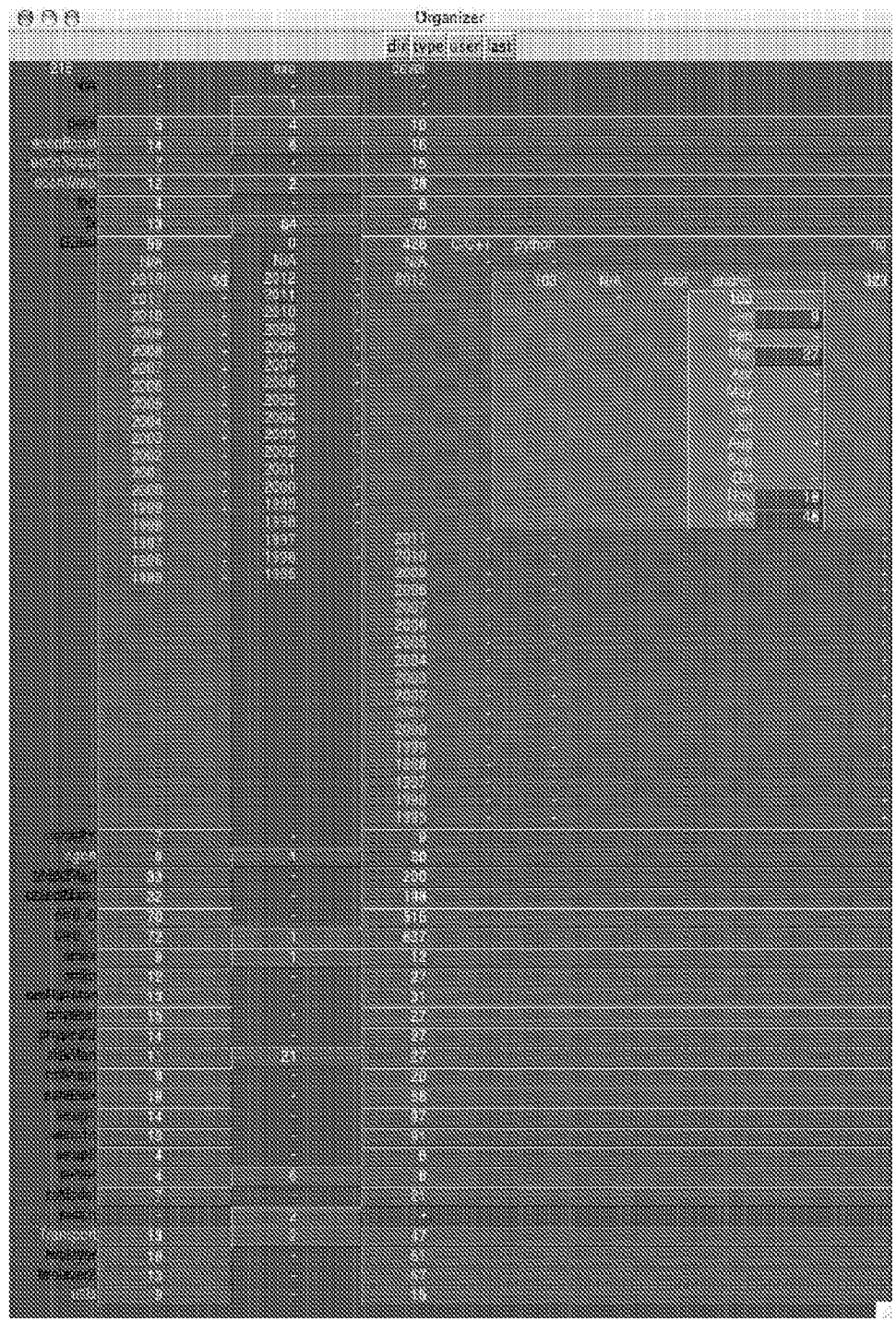
FIG. 21 is another example of a data browsing GUI expanded along multiple directions.
Figure 22:
FIG. 22 is another example of a data browsing GUI expanded along multiple directions.
Figure 23:
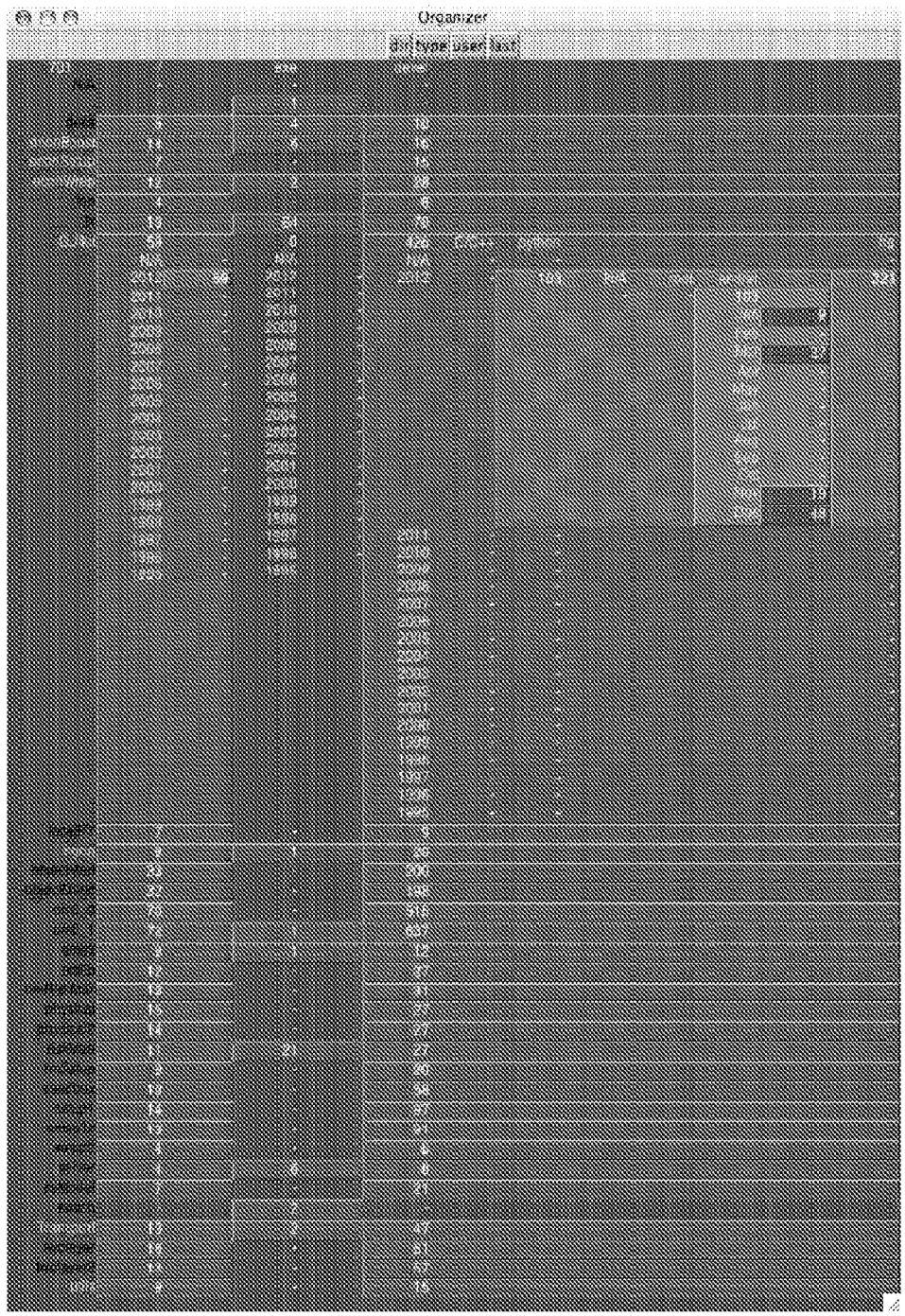
FIG. 23 is another example of a data browsing GUI.

Multi-descriptions delimit subsets of data. In FIG. 11, the 59 files that are directories, sit under GUIkit and were last changed in 2012, share the multi-description {dir: GUIkit, type: |, user: all, last: 2012}. Another use of multi-descriptions is specifying changes to the display. The transition FIG. 10→FIG. 11 breaks down the multi-description {dir: GUIkit, type: all, user: all, last: all} by the last criterion.

A multi-description x will be said to fit another multi-description y if every criterion's category appearing in x is narrower than the same criterion's category appearing in y. Equivalently, x is narrower than y and y is broader than x. The depth of a multi-description will be the sum of the depths of the categories comprising it.

1.3 Nested-Table Displays

A nested-table display can be structured to include rectangular arrays and each array includes a total and a breakdown. The breakdown can be 1-dimensional (vertical or horizontal) or 2-dimensional. Numbers and labels can be arranged and formatted in a way that makes obvious what is a total and what is a breakdown, even when there are quite a few arrays.

One possible formatting scheme is used in the figures. Labels, rather than sub-aggregates, are aligned with the total, and different colors insure labels and values cannot be confused. When a child array is created, rows and columns are enlarged appropriately to maintain the alignment of parent arrays.

To make breakdowns visually distinct, they are enclosed in a border and given a different background color, with the exception of a breakdown that has no data, in which case a dash is displayed with no border, using the parent's background color. The breakdown background color loops through 4 shades of gray, which keeps adjacent areas distinct, without using too many colors. Labels, values and the hide/include category colors (see Section 3.2) seen clearly on these 4 shades of gray; light blue, white, orange and black work well.

Figure 27:
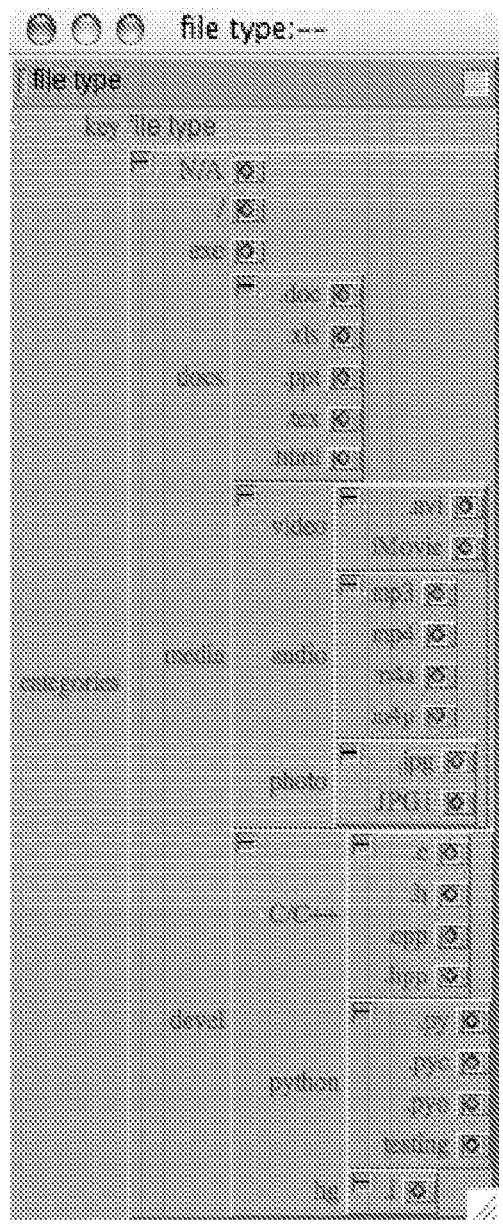
FIG. 27 is another example of a data browsing GUI.

Besides the rectangular array, the nested-table display generalizes the tree display, which can be simulated using 1-dimensional vertical breakdowns alone. That can be seen in FIG. 27, albeit with different formatting.

1.4 Data Items and Aggregate Measures

The purpose of working with criteria is to apply them to data sets. The two are linked via a computer-performed calculation that, for each criterion and data item, provides the category the data item belongs to. For uniformity, if a data item is not related to a criterion, a simple function that returns all or N/A can be used.

Given a data item x, a multi-description $m_x$ can be obtained by performing this calculation for every criterion under consideration. $m_x$ can be used to decide whether the item belongs to a set defined by a multi-description d, by checking if $m_x$ fits d. This can be done via known algorithms for directed graphs.

In some cases a data item belongs to more than one category, e.g. a rain jacket sold under both casual and mountaineering wear. In that case, what is obtained is not one multi-description $m_x$ but a set of multi-descriptions, one for each combination of the several categories the item belongs to for each criterion. In this case, the item fits a multi-description d if at least one of its associated multi-descriptions fits d.

When working with large sets of data, a user tends to be interested in an overall characteristic of the set rather than individual items. Such overall characteristics are referred to as aggregate measures. Related to e.g. inventories, some familiar aggregate measures are total cost, total weight, and average time since purchased. Given a multi-description d, a data item set and an aggregate measure, an aggregate can be computed for the items whose multi-description fits d. All display values are aggregates.

Some aggregate measures are applicable to all data sets. The number of items in the set is an important one, often of interest. Another is whether the set is empty or not. While more abstract, it helps better reproduce tree displays with nested-table displays. Tree displays often show a ⊞ when there are items underneath, but not otherwise. This can be replicated using the empty-or-not aggregate measure, and displaying ⊞ or ☐ appropriately.

1.5 Putting it Together

Figure 9:
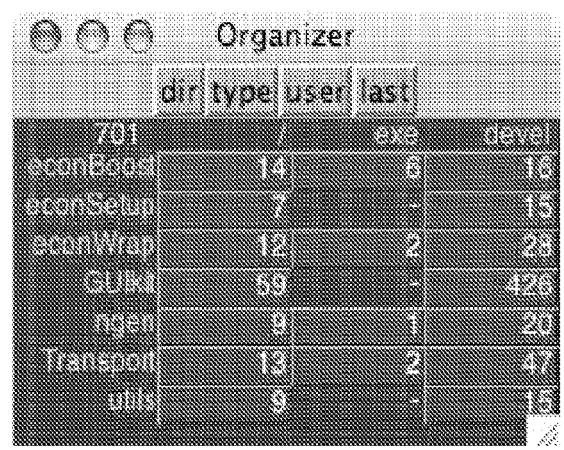
FIG. 9 is another example of a data browsing GUI.

Nested-table displays are suited to working with multiple criteria. This is easiest shown on a concrete case, e.g. the transition FIG. 9→FIG. 10. For that transition, the type criterion was dropped onto the 426 files under the GUIkit and devel categories, i.e. the files that fit the multi-description d={dir: GUIkit, type: devel, user: all, last: all}. As they are all devel files, breaking down again by type shows the sub-categories of devel: C/C++, python and hg (which can be seen in FIG. 27). For each sub-category, a new multi-description can be obtained from d by replacing devel, and an aggregate measure computed. The display is updated by adding a 1-dimensional, horizontal breakdown.

Figure 2:
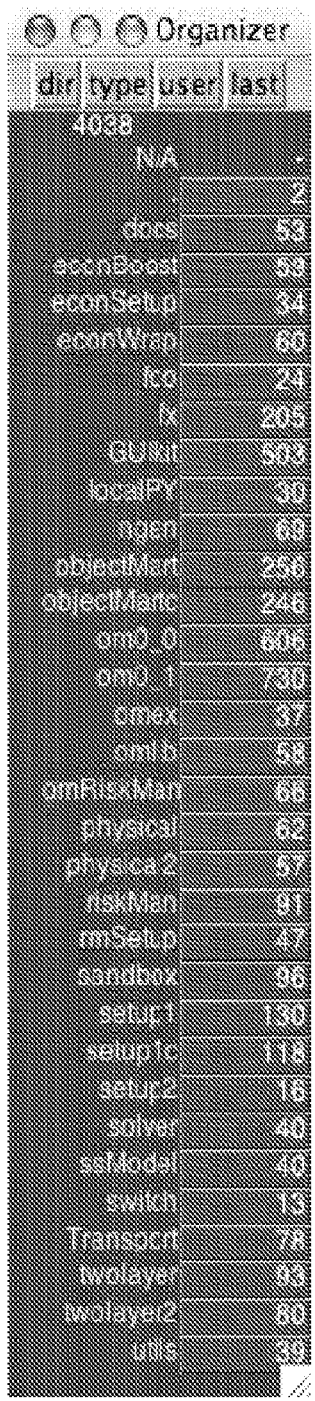
FIG. 2 is an example screen shot of a menu for data browsing.
Figure 6:
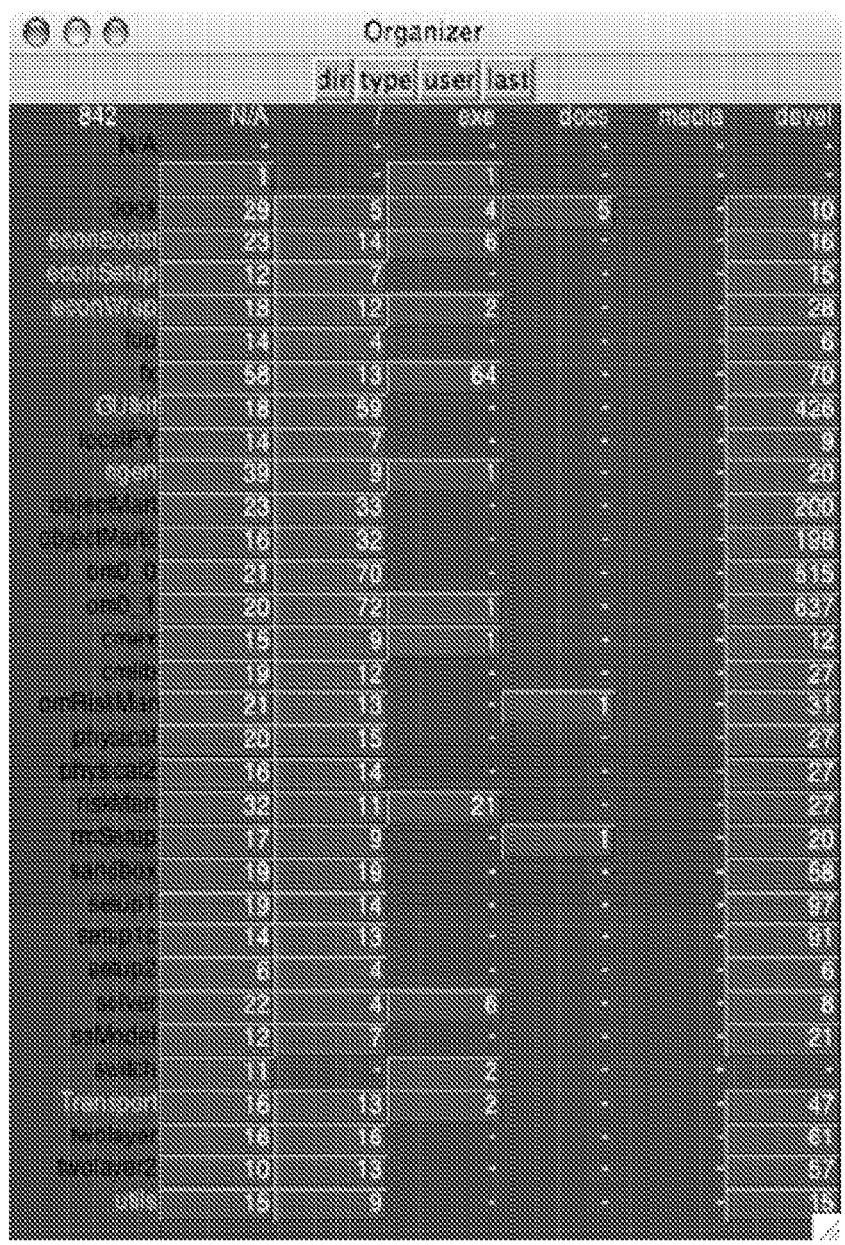
FIG. 6 is another example of a data browsing GUI.
Figure 8:
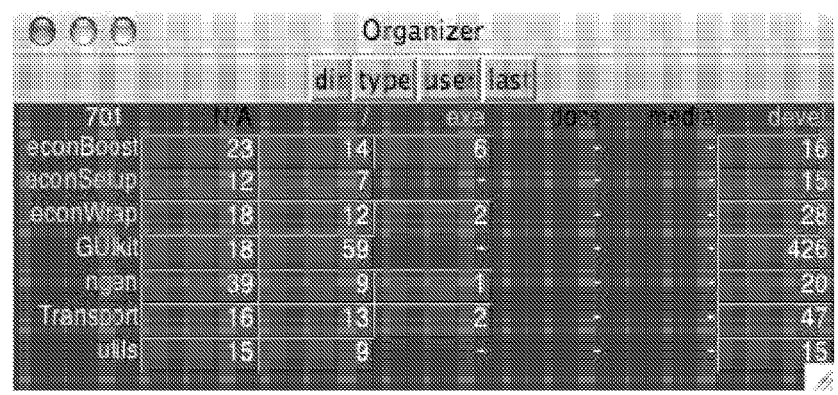
FIG. 8 is another example of a data browsing GUI.

Generalizing, a state of the display is represented by a tree with one vertex for each aggregate shown. For example, the tree that generates FIG. 2 has a root vertex with 33 children, one for each line in the breakdown. Each vertex can contain:

The aggregate's multi-description.

Criteria assigned to the horizontal and vertical directions, if any. There are 3 possibilities:

The vertex has no criteria associated with it. Such a vertex will have no further breakdowns, and will be a leaf of the tree (no descendants).

The vertex has exactly one criterion associated with it. Such a vertex will have a 1-dimensional array of child vertices indexed by the sub-categories of the category of the assigned criterion appearing in the multi-description of the vertex. Geometrically, the child aggregates will be arranged along the direction the criterion was assigned to. Child multi-descriptions are obtained by replacing the appropriate sub-category in the multi-description of the vertex.

The vertex has both a horizontal ($C_H$) and a vertical criterion ($C_V$) assigned. Denote by d the multi-description of the vertex. The child vertices will form a 2-dimensional array indexed by pairs of subcategories ($s_h$, $s_w$), where sh spans the sub-categories of the category $c_h$ of $C_H$ appearing in d, and $s_v$ spans the sub-categories of the category $c_v$ of $C_V$ appearing in d. Geometrically the new aggregates are displayed in a 2-dimensional array, with column labels provided by $s_h$ and row labels provided by $s_v$. Child multi-descriptions are obtained from d by replacing $c_h$, $c_v$ with $s_h$ and $s_v$.

Whenever a criterion is assigned or unassigned, the vertex is recomputed and all child vertices are discarded. Any breakdowns in child vertices will be lost. If one criterion of a 2-dimensional breakdown is unassigned, the breakdown becomes 1-dimensional.

To interact with the display, commands to assign a criterion to a direction of an aggregate, and to undo a prior assignment, are needed. For some sample interface examples, described herein, this functionality consists of the D+ and D- commands, with the limitation that a drop only works if the desired breakdown direction is free. To avoid confusion regarding figures, the sample interface may incorporate the features described with respect to "resolving drop conflicts."

2. Additional Example Refinements

While the discussion above describes some implementation examples, a number of variations are possible, each requiring some degree of work and insight. The sample interface described herein incorporates some, but not all of the features below.

2.1 Displaying Item Lists

Besides displaying aggregate measures, it may be useful to display the items comprising an aggregate. An example interface for this are the L+ and L- commands, with effects occurring in FIG. 15, FIG. 16, FIG. 17 and FIG. 18. A way to store this information is given by "aggregates currently displayed list" feature disclosed below.

2.2 Simplifying the Display

By design, the number of sub-categories of a category in a criterion should be kept small for the display to be easily read.

Even so, not all the data may be of interest. A solution to simplify the display is to designate categories as included or hidden. A hidden category will not be shown, and its items will be excluded from aggregates and item lists.

To be precise, for aggregates below the breakdown where the hiding takes place, the display should behave as if the arrow in the directed graph, going from the hidden category to its parent category appearing in the breakdown's multi-description, has been severed. While for a tree, items fitting the hidden category will no longer be tallied in the aggregate, for a general directed graph that is not true; narrower categories can be reached more than one way.

A possible user interface for managing included/hidden categories consists of the editing commands in Section 3.2. For examples, refer to FIG. 3, FIG. 4, FIG. 5, FIG. 6, FIG. 7, FIG. 8 and FIG. 9.

Another way to reduce the complexity of the display is provided by restrictions, which allow the display to behave as if the set of items was reduced to those matching a multi-description. Any visible aggregate can be used to restrict; the relevant Section 3.2 commands are R+ and R−, put at work in FIG. 12, FIG. 13, FIG. 14, FIG. 15, FIG. 16, FIG. 17, FIG. 18 and FIG. 19.

To implement these two features, the editing and restriction information can be stored as part of the display state. For one convenient way see Section 2.5.

2.3 Resolving Drop Conflicts

It can be desirable to perform more than one breakdown with a single command. As an example, look at the D+ command used to reach FIG. 11. Its intent is to break down all the aggregates on the GUIkit line using the last criterion. This requires 3 break-downs, resulting in a 1-dimensional array for the first two columns, and in converting a horizontal 1-dimensional array into a 2-dimensional one for the third.

Figure 24:
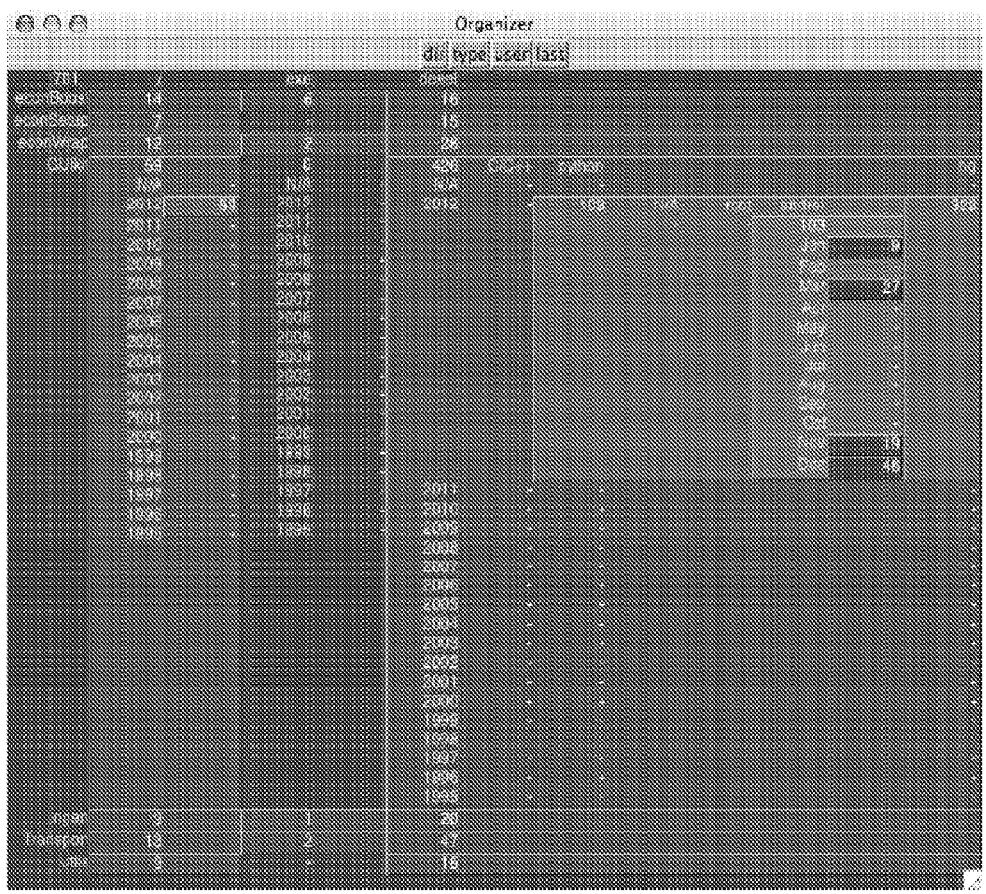
FIG. 24 is another example of a data browsing GUI expanded along multiple directions.
Figure 25:
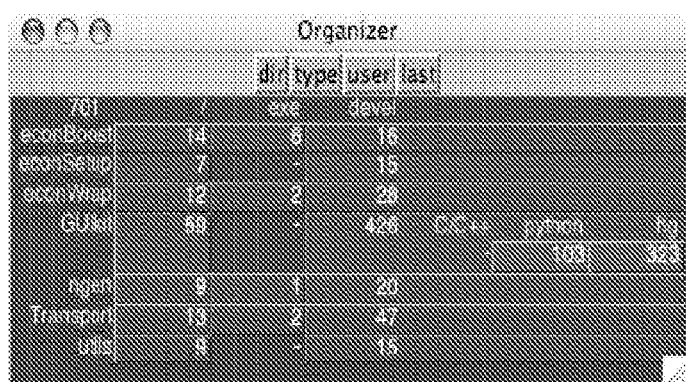
FIG. 25 is another example of a data browsing GUI expanded along multiple directions.

If one command can result in multiple breakdowns, a feature is to be able to revert. For D- to accomplish the transition FIG. 24→FIG. 25, it becomes desirable to represent how breakdowns are related.

Complex cases can occur. If the breakdown into C/C++, python and hg in FIG. 11 had been vertical, the additional last breakdown could not have been done directly, as the vertical direction is already occupied. Passing it down to children works, but creates further complications. Should the C/C++, python and hg breakdown be removed, the conflict disappears and child breakdowns would have to be consolidated. It is not clear how that should be detected.

Figure 26:
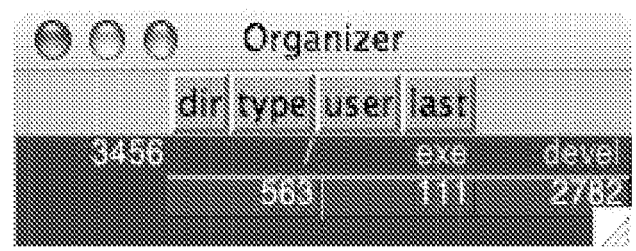
FIG. 26 is another example of a data browsing GUI.

One way of avoiding representing such complex relationships is to keep track only of desired drops, which are breakdown commands by the user, and translate them into applied drops, corresponding to displayed breakdowns. A desired drop can result in several applied drops, as seen above (FIG. 11). No applied drops is also possible, when the desired drop was based on the results of another desired drop that was later removed (e.g. FIG. 25→FIG. 26).

A desired drop can be characterized by the following:

target: The multi-description of the aggregate or label onto which the criterion was dropped.

direction: Horizontal or vertical.

criterion: The criterion that was dropped.

index: A unique integer number for every drop; earlier drops have lower numbers.

The relationship between desired drops and applied drops can is defined by 3 aspects:

No desired drop is applied above its target.

Every desired drop is applied once to data that fits its target. More precisely, every aggregate that is not broken down, and whose multi-description fits the target of a desired drop, have one applied drop coming from that desired drop, above it in the tree.

A desired drop is passed on to children only if it conflicts with a higher priority drop. Two desired drops conflict if they have the same direction or the same criterion, as they cannot be displayed correctly by a rectangular table of values with labels on the outside. Preference is given to drops with low target depths; for equal depths, a lower index will be applied first, i.e. the earlier drop.

Based on the desired drops, a tree in which every vertex corresponds to a displayed aggregate can be constructed iteratively. A vertex will have its own breakdown and child vertices if it has any applied drops. Visually the result looks the same as for Section 1.5; the difference is, in essence, that in Section 1.5 applied drops are managed by the user interface directly, while here they are computed from desired drops.

Each vertex in the tree is characterized by:

content: A multi-description. Data items that fit the content are tallied in its aggregate.

applied drops: 0, 1 or 2 drops. They determine if the vertex is a single aggregate, a 1-dimensional breakdown, or a 2-dimensional breakdown. If there are two drops, they cannot conflict (see requirement (B) above).

For each vertex v in the tree, the following sets of drops are computed:

I(v): The set of inherited drops that children of v tries to accommodate.

P(v): The set of potential drops that might be needed below v. These are desired drops, for which v's content does not fit the target. As such, by requirement (A) these drops cannot be applied yet.

F(v): The set of found drops, potential drops of the parent which, absent conflicts, could be applied at v. Found drops are a subset of the required drops.

R(v): The set of desirable drops that are to be applied to v or all its children.

U(v): The set of redundant drops, which have not been applied yet but have become redundant at v or below.

A(v): The set of applied drops, which will be used for the break-down at v.

The calculation starts with a single vertex root, whose content consists of criteria's all categories. For each vertex v, the above sets are computed from the sets P(p) and I(p) belonging to its parent p; in the case of root, the set of desired drops and the empty set are used instead of P(p) and I(p). The iteration rules are:

F(v) will consist of the drops in P(p) with target broader than the content of v.

R(v) will be I(p) together with F(v).

U(v) will consist of the drops in R(v) for which the category in the content of v corresponding to the drop criterion has no sub-categories.

A(v) will consist of however many drops from R(v), not in U(v), can be accommodated without conflicts, taken in the priority order (see requirements (B) and (C) above).

I(v) will consist of the drops in R(v) that are not in A(v) or U(v).

P(v) will consist of the drops in P(p) not in F(v).

After computing the above sets for a vertex v, its children are computed based on A(v). With no conflicts among them, there can be at most two drops. The cases mimic those of Section 1.5:

A(v) is empty. The vertex has no children.

A(v) consists of exactly one element. The children will form a vector indexed by the sub-categories of the category in v's content corresponding to the drop criterion.

A(v) consists exactly of two elements. The children will form a 2-dimensional array.

This construction meets requirements (A), (B) and (C) above, and it can be shown that any other calculation satisfying (A), (B) and (C) will produce the same results.

With this approach, reverting a drop is accomplished by simply deleting it from the desired drop set, and the consequences are figured out by the calculation above.

2.4 Mixing Aggregate Measures

It is desirable to be able to mix more than one aggregation measure in the same display. For example, after isolating a number of files by looking at file counts, the user could see how much the disk space they occupy by switching the aggregate to show disk space.

Aggregate measure drops can be represented by a triplet (target, aggregation measure, priority), similar to the description of desired criterion drops. The calculation of Section 2.3 can be adapted as follows:

Measure drops do not conflict with each other, or with criteria drops.

Measure drops do not cause the creation of child vertices.

Applied measure drops are left in the set of inherited drops, as they need to be applied to all child vertices.

Of the measure drops applied to a vertex, the display will use the one with least priority. This means the measure with the deepest target, or in the case of equal depths, the most recent one. Switching an aggregation measure will change child vertices, unless they have aggregate measure drops of their own.

The user interface could have a list of aggregation measures at the top of the display, and allow aggregate measures to be dropped wherever a criterion can be.

2.5 Adapting the Display to Changing Data

In most realistic situations data is dynamic. Consider a tool to browse the articles available on an online store. When a display is saved for later use, if available articles or their categorizations change, the display will be lost unless it can be adjusted. The purpose of this section is to present a storage format that, in addition to supporting the features discussed so far, can be adjusted after changes in the data set, among the categories within criteria, and of the criteria list itself.

An instance of the storage format, called a display state, is comprised of the following:

Desired drops: For each drop, the following are stored:
target: A multi-description, see Section 2.3.
criterion: The breakdown criterion.
direction: The breakdown direction, one of horizontal or vertical.
index: A unique integer. Earlier criterion drops have lower numbers.
hiding data: Information about included/hidden categories. All occurrences of a category produced by a desired drop are hidden together. An example would be hiding one of the three 2012's in FIG. 11, making all 3 disappear.

Aggregate measure drops: Each consists of:
target: A multi-description, see Section 2.4.
measure: The aggregate measure.
index: A unique integer. Earlier measure drops have lower numbers.

Aggregates currently displaying item lists: Identified by the aggregate's multi-description.

Sets of categories currently under edit: Identified by the brake-down's multi-description, and the set's geometric direction.

Restrictions: Represented similarly to aggregate measure drops, each consists of:
target: A multi-description.
index: A unique integer. Earlier restrictions have lower numbers. The above restriction data can be processed as the tree of aggregates is constructed, and a sequence of multi-descriptions, each narrower than its predecessor, computed. The display can be adjusted based on this sequence.

As the display state does not reference data items, it can be updated for changes in data by simply recomputing it. For criteria and category changes, the adjustment is as follows:

Add a criterion: All multi-descriptions used throughout the display state representations can be extended with the all category of the new criterion. This creates a display state compatible with the new criterion list.

Remove a criterion: Any criterion drop, measure drop, restriction, edit, or item list expansion, that contains a multi-description referencing any category of the deleted criterion other than all, is deleted.

Add categories: A new category can not appear in existing multi-descriptions. It does however need a choice of hidden or included, and either is valid.

Remove categories: Again, display state components containing multi-descriptions that reference a category that no longer exists are deleted.

Importantly, the above adjustments produce a correct display state because there are no constraints among components. This is a key feature of the display state format, and of the calculations that render the display based on it.

2.6 Minimizing Clutter

With many nested tables, the display can get complicated, and it helps to keep buttons and other non-essential features to a minimum. A system of drag-and-drops and context sensitive cursors makes the interface intuitive, visually simple and less error prone. The same drag-and-drop works with both horizontal and visual breakdowns, and the user knows which will occur before a drop is performed (see Section 3.2). Likewise, distinct cursors for restriction and undoing drops make things easier.

2.7 Filtering

Range filtering is useful when browsing data. For example, one could be interested in files changed from March 2009 through February 2012. While this can be accomplished by hiding sub-categories, it is tedious.

While in general a criterion does not have a natural order, trees in which every category's sub-categories are ordered can be used to define ranges. This is the case for numerical criteria, such as time. The order is not entirely free of convention, as for example one has to decide whether a year comes before its January sub-category, after its December sub-category, or somewhere in between. While before is quite reasonable, the user will have to remember that $2009 \leq date \leq 2012$ means Jan. 1, 2009, . . . , Dec. 31, 2011. Ordering trees is a well understood topic in the prior art.

Filters can be stored similar to included/hidden category choices.

3. Example User Interfaces

Example user interfaces are described through a file browsing example.

3.1 Display Elements

Visually the display is composed of one or more of the following elements:

criterion: Available criteria are shown at the top.
category: Labels for rows and columns Shown in light-blue if not being edited, and orange/black in edit mode.
aggregate: The aggregate value of items that match a combination of categories. Shown in white. For the file example, it is the number of files (see Section 1.4).
total: The aggregate for all data items under consideration. It is the very top-left value.
item list: A list of the data items comprising an aggregate.

3.2 Summary of Commands

Here are the commands supported by the sample interface, with a mnemonic in parenthesis:

(D+) Drop: Drag and drop a criterion on a aggregate or category. When hovering over the drop area, the cursor will change to ⇓ or ⇒, showing the direction that will be used for the breakdown.

(D−) Undo Drop: Drag and drop a category to any aggregate. The cursor will be x.

(L+)/(L−) See/hide item list: Click on aggregate.

(R+) Restrict total: Clicking in the upper-left area of an aggregate causes the aggregate to become the new total. The hovering cursor is.

(R−) Undo restrict: Press Escape key. Removes the most recent restrict.

Editing categories: Each category can be excluded from aggregates and hidden from view. Included categories are shown in orange, hidden ones in black. Items from excluded categories are filtered out of any item lists.

(E) Edit: Click on a category. Aligned categories will be edited as well.

(Q) End edit: Press Enter. Saves include/hide selections for the entire display.

(i)/(h) Include/hide one category: Click on category.

(I)/(H) Include/hide all categories: Press Equal/Minus key. Affects all categories under edit.

3.3 Screen-Shot Sequence

The sequence will demonstrate browsing files organized by four criteria: location (dir), type of file (type), owner of file (user), and date when the file was last accessed (last). The aggregation measure in this case is the number of files matching a combination of categories. At the start, the display shows the criteria and the total number of files:

To see the breakdown of files by directory, the dir criterion can be dragged and dropped over the total (D+ command). If the drop is towards the left/lower corner of the total, the cursor will show ⇓, and the breakdown will be displayed vertically, as seen below:

To add a breakdown by file type, the type criterion is dragged and dropped towards the right/upper corner of the total (D+ command). The cursor changes to ⇒. The display becomes a table with directories as lines, and file type categories as columns:

The user might not be interested in all subdirectories. Subdirectories (categories in general) can be hidden. The first step is to click on a category, e.g. econBoost (E command). This will put econBoost and its sister categories in edit mode; categories will be shown in orange or black, depending on whether they are included or hidden. In this case all categories are included:

If only a few sub-categories are of interest, the user can hide all sub-categories first by pressing the minus key (H command). Excluded categories show up in black:

To add individual categories back, the user can click on them (i command) in turn. The total will update after every change:

The Enter key exits the edit mode (Q command). The display now shows only the included categories:

Columns also can be hidden. After clicking on any column label, e.g. exe (E command), clicking on any included category hides it (h command). In this example N/A, docs and media were hidden:

The Enter key again exits the edit mode (Q command).

Drops (D+ command) can be applied to any aggregate, not just the total. Applying type horizontally to the files that match both the GUIkit location and the devel file type (the number 426) will expose the sub-categories of the devel.

Drops (D+ command) can also be applied to a label, in which case a breakdown will be performed for all aggregates under that label. Here the last criterion was applied to GUIkit vertically:

It is possible to restrict the total to an aggregate. In this case the 103 python files last changed in 2012 were chosen, by clicking in the upper left corner of the aggregate (R+ command). While hovering around the upper-left corner, the cursor becomes N. The display simply shows that aggregate as a total, maintaining the coloring:

Drops can be performed after restricting. Here the user criterion was applied (D+ command):

Successive restrictions are possible. Here the total was again restricted to the 103 files belonging to the user andrei (R+ command):

Drops can still be performed after successive restrictions. Here the last criterion is applied again to the 103 files (D+ command), showing months as the sub-categories of 2012:

The list of items comprising an aggregate can be displayed at any time by clicking on the aggregate (L+ command). The list is shown with a scroll bar, and the surrounding display is expanded to make room for it. In this example the 19 files for November are shown:

Restrictions can be undone, starting with the most recent one (R-command), by pressing the Escape key. The display maintains all other properties, e.g. the item lists displayed.

The list of items for an aggregate can be hidden by clicking again on the aggregate (L-command).

Undoing restrictions can continue as long as there are any remaining. Here Escape removes the first restriction (R-command), showing the full display:

The visual layout constructed for a category is remembered if a category is hidden. The first step to demonstrate that is putting GUIkit and its sister categories in edit mode, by clicking on GUIkit (E command). Both hidden and included categories are shown:

Clicking on GUIkit again hides it, and the color turns black (h command):

Hitting the Enter key (Q command) exits the edit mode, and the line corresponding to GUIkit disappears:

GUIkit can be restored by clicking on any of its sister categories, e.g. econBoost (E command) and then on GUIkit (i command):

Enter again exits the edit mode (Q command), and hidden categories disappear:

As it can be seen, the visual details of the GUIkit line have been preserved.

Drops can be undone (D-command). This is done by dragging any category that resulted from that drop onto any aggregate. For example, dragging the 2012 under GUIkit and/onto the 59 to its right removes the drop of last over GUIkit that led to FIG. 11. That drop caused breakdowns in 3 places (see FIG. 11), and all those break-downs are now removed together. This is important, as it would be tedious to revert all break-downs caused by a single drop one by one. The breakdown of 103 by user also disappears, as that relied on the category 2012 which became visible as a result of the drop now being reversed. The same applies to the breakdown by months resulting from applying last to the 103 files belonging to andrei.

The breakdown of GUIkit and devel by type survives, as it did not rely on the breakdown by last which was just reverted. A further D-command by dragging utils onto the aggregate 9 to its right leaves the display with a breakdown by type (some categories still hidden):

Another D-command returns the display to the initial state of FIG. 1.

Figure 29:
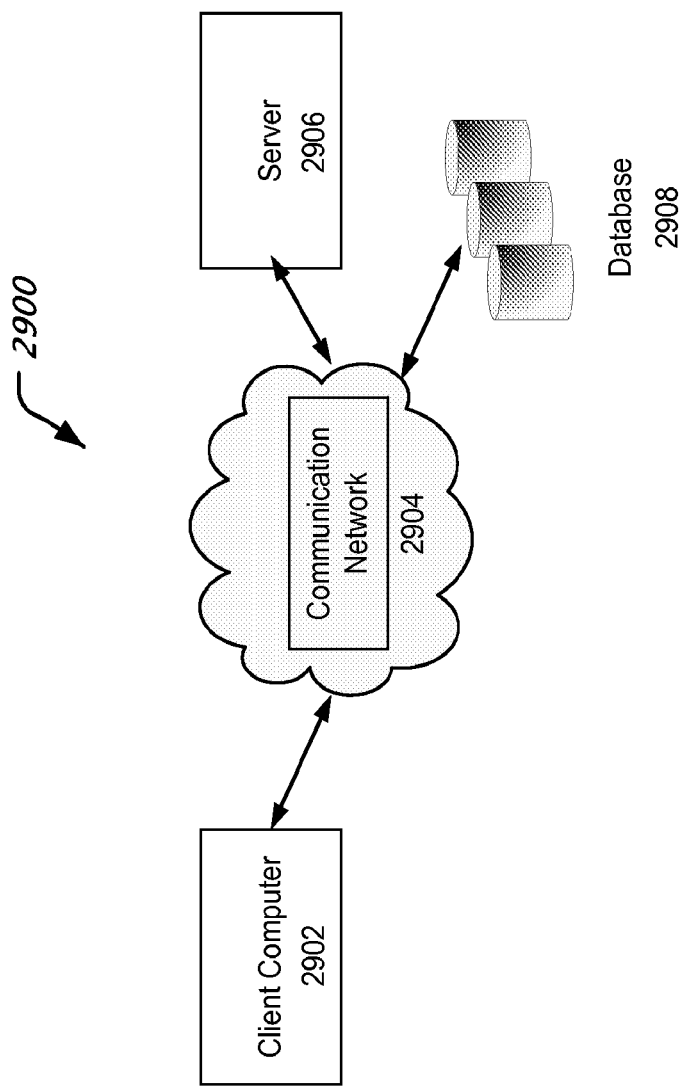
FIG. 29 shows a system for data organization and presentation.

FIG. 29 depicts an example system 2900 for implementing the disclosed techniques for organizing and presenting data to users. This system 2900 includes one or more client computers 2902, communicatively coupled over a communication network 2904 with one or more servers 2906 and a database 2908 stored at one or more computer servers or networked storage devices. The various techniques described in this document can be implemented at the client computer 2902, the server 2906 or partly between the client computer 2902 and the server 2906.

The communication network 2904 can be a suitable network, such as a wired or wireless network, e.g., the Internet, Ethernet, wireless cellular network such as 3G, Long Term Evolution (LTE) network, WiMax, etc. In various embodiments, the client computer 2902 may be a computer, a smartphone, a tablet device, using a suitable operating system. The server 2906 may include a processor, instruction memory and a suitable operating system. The database 2908 may be implemented using storage such as hard drive, flash memory, etc. In various embodiments, the server 2906 and the database 2908 may be implemented on the same hardware platform (e.g., sharing the same power source) or may comprises two different platforms connected over a local connection such as an SCSI interface.

Figure 30:
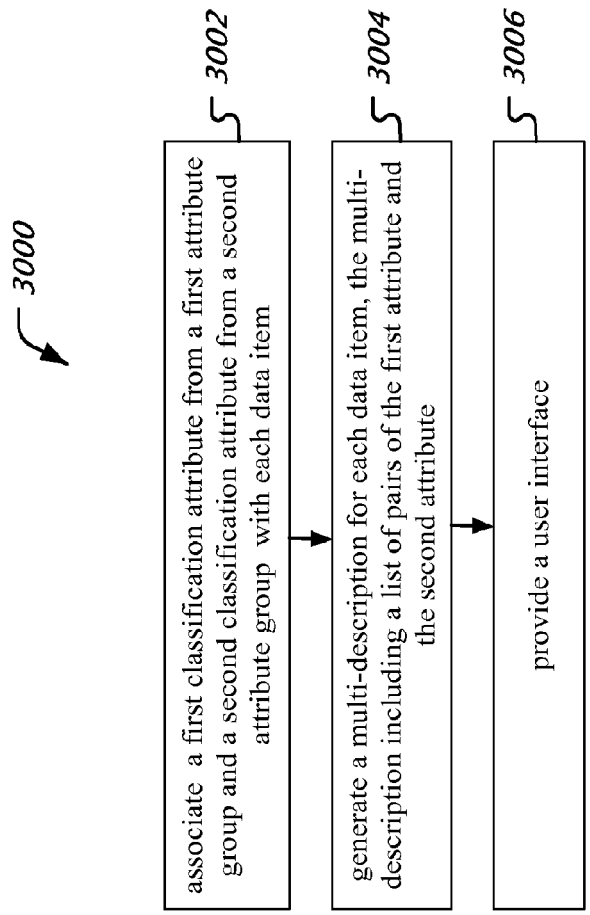
FIG. 30 is a flow chart representation of a process of displaying data to a user.

FIG. 30 is a flowchart representation of a process 3000 of displaying data to a user. The process may be implemented, e.g., on the client computer 2902, previously described. The displayed data includes a plurality of data items.

At 3002, a first classification attribute from a first attribute group and a second classification attribute from a second attribute group are associated with each data item.

At 3004, a multi-description is generated for each data item. The multi-description includes a list of pairs of the first attribute and the second attribute.

At 3006, a user interface is provided to the user. The user interface includes a first display area and a second display area. The first display area includes a first control widget that is representative of the first attribute group and a second widget that represents the second attribute group. A first measure of a first portion of the plurality of data items can be displayed in the second display area in response to a user activating the first control widget.

In some implementations, a third display area may be provided in the user interface. A second measure of a second portion of the plurality of data items is displayed in response to the user activating the second control widget. In some implementations, the first measure of the first portion of the plurality of data items is displayed in the second display area along a first display direction and wherein the measure of the second portion of the plurality of data items is displayed in the third display area in a second display direction that is orthogonal to the first display direction.

In some implementations, the process 3000 further includes visually organizing the second measure of the second portion of plurality of data items displayed in the third display area based on a category of the second classification attribute.

In some implementations, the process 3000 further includes receiving user activations in the second display area, the user activations indicating which of the plurality of data items to hide from view and hiding the selected plurality of data items from the second display area, including any data items from the selected plurality of data items displayed in the third display area.

In some implementations, the first attribute group and the second attribute group in the process 3000 are related to each other as a tree structure so that each entry in the first attribute group is further characterized by another entry in the second attribute group.

In some implementations, the first and the second control widgets respectively include a first and a second on-screen button icon.

In some implementations, the first measure comprises a number of data items in the first portion of the plurality of data items.

In some implementations, the user activating the first control widget comprises the user dragging and dropping the first control widget on the first display area.

Figure 31:
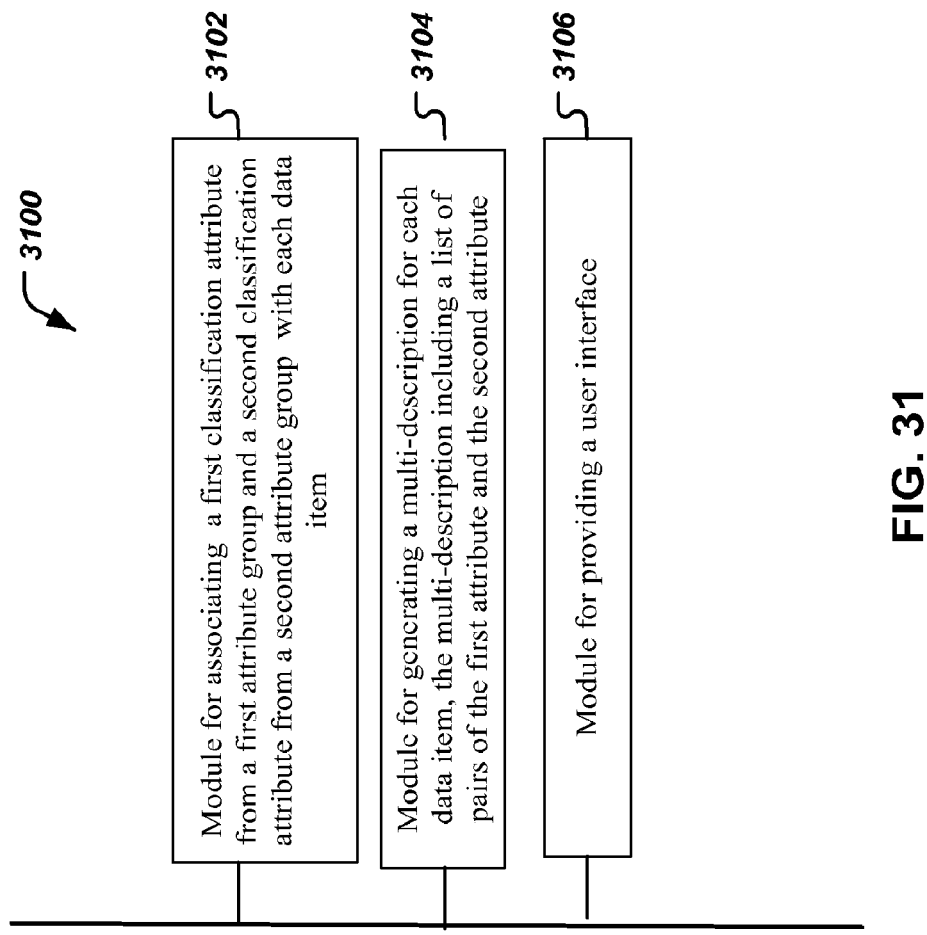
FIG. 31 is a block diagram representation of an apparatus for enabling browsing of data subject to a plurality of classification characteristics.

FIG. 31 is a block diagram representation of an apparatus 3100 for enabling browsing of data subject to a plurality of classification characteristics. The module 3102 is for associating a first classification attribute from a first attribute group and a second classification attribute from a second attribute group with each data item. The module 3104 is for generating a multi-description for each data item, the multi-description including a list of pairs of the first attribute and the second attribute. The module 3406 is for providing a user interface comprising a first display area in including a first control widget representative of the first attribute group and a second control widget representative of the second attribute group and a second display area in which a first measure of a first portion of the plurality of data items can be displayed in response to a user activating the first control widget.

Figure 32:
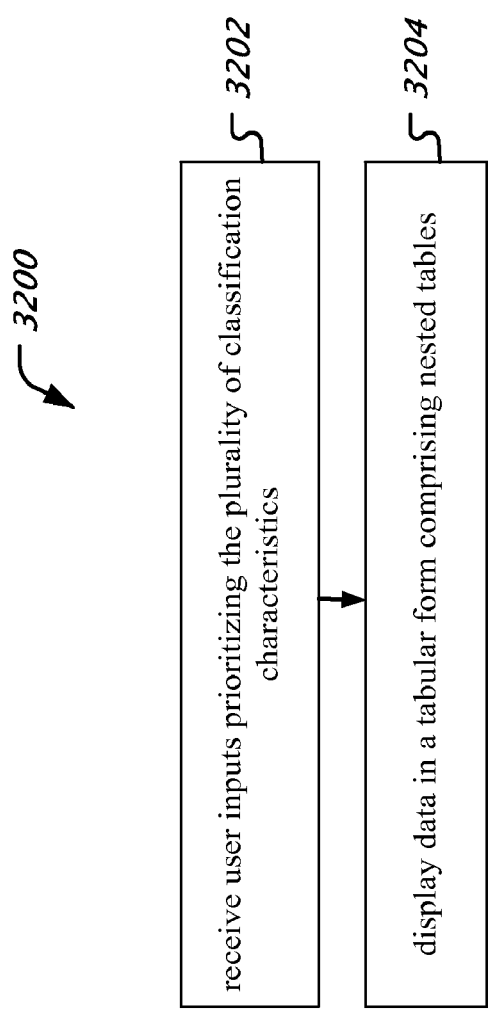
FIG. 32 is a flowchart representation of a process of enabling browsing of data subject to a plurality of classification characteristics.

FIG. 32 is a flowchart representation of a process 3200 of enabling browsing of data subject to a plurality of classification characteristics. The process 3200 is implemented, e.g., by a user's computer.

Figure 3:
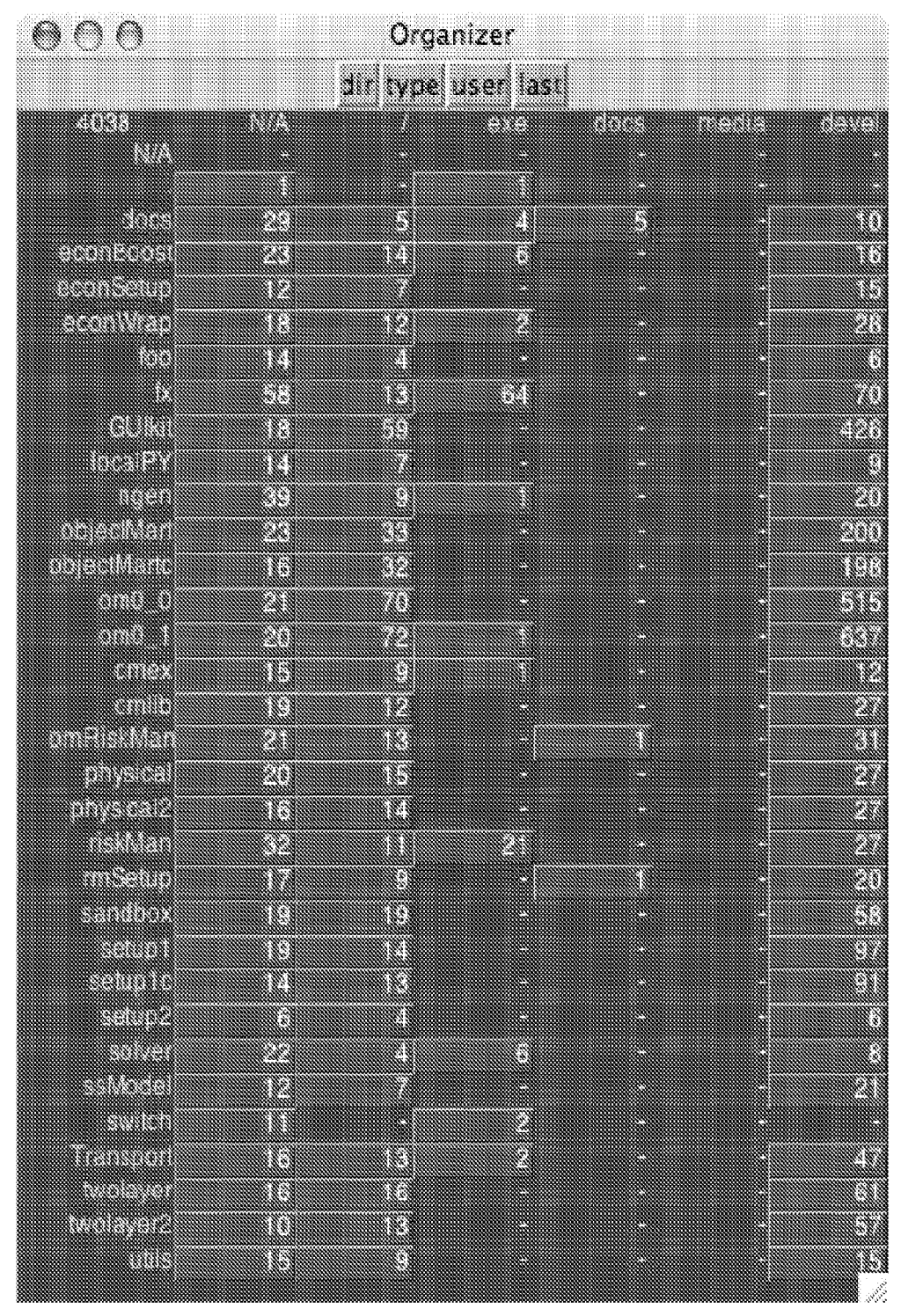

At 3202, user inputs prioritizing the plurality of classification characteristics are received. With reference to FIG. 3, in some implementations, the characteristics may be, e.g., directory holding the file, file type, user(s) allowed to access the file and last modified time. In another example, a Men's blue t-shirt may be identified by a user as having "clothing" and "sports wear" classification characteristics.

At 3204, data is displayed in a tabular form comprising nested tables based on the received plurality of criterion such that a table corresponding to a first priority classification characteristic is displayed to fit within a display area of another table corresponding to a second priority classification characteristic when the second priority is at a higher priority level than the first priority classification characteristic.

In some implementations, the process 3200 further includes associating, with each of the plurality of classification characteristics, one or more classification sub-characteristics and organizing, in the table corresponding to the first classification characteristics, data display according to the associated one or more classification sub-characteristics.

Figure 33:
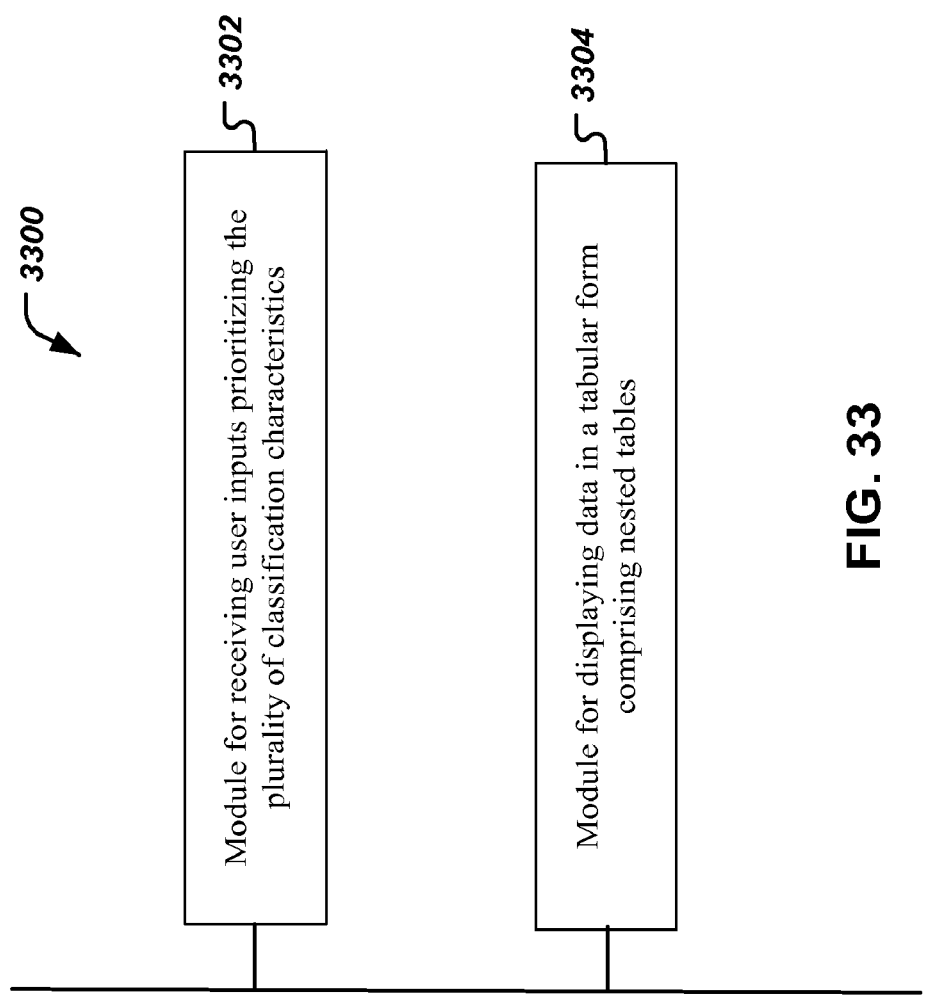
FIG. 33 is a block diagram representation of an apparatus for facilitating data viewing by a user.

FIG. 33 is a block diagram representation of an apparatus 3300 for enabling browsing of data subject to a plurality of classification characteristics. The module 3302 is for receiving user inputs prioritizing the plurality of classification characteristics. The module 3304 is for displaying data in a tabular form comprising nested tables based on the received plurality of criterion such that a table corresponding to a first priority classification characteristic is displayed to fit within a display area of another table corresponding to a second priority classification characteristic when the second priority is at a higher priority level than the first priority classification characteristic.

Figure 34:
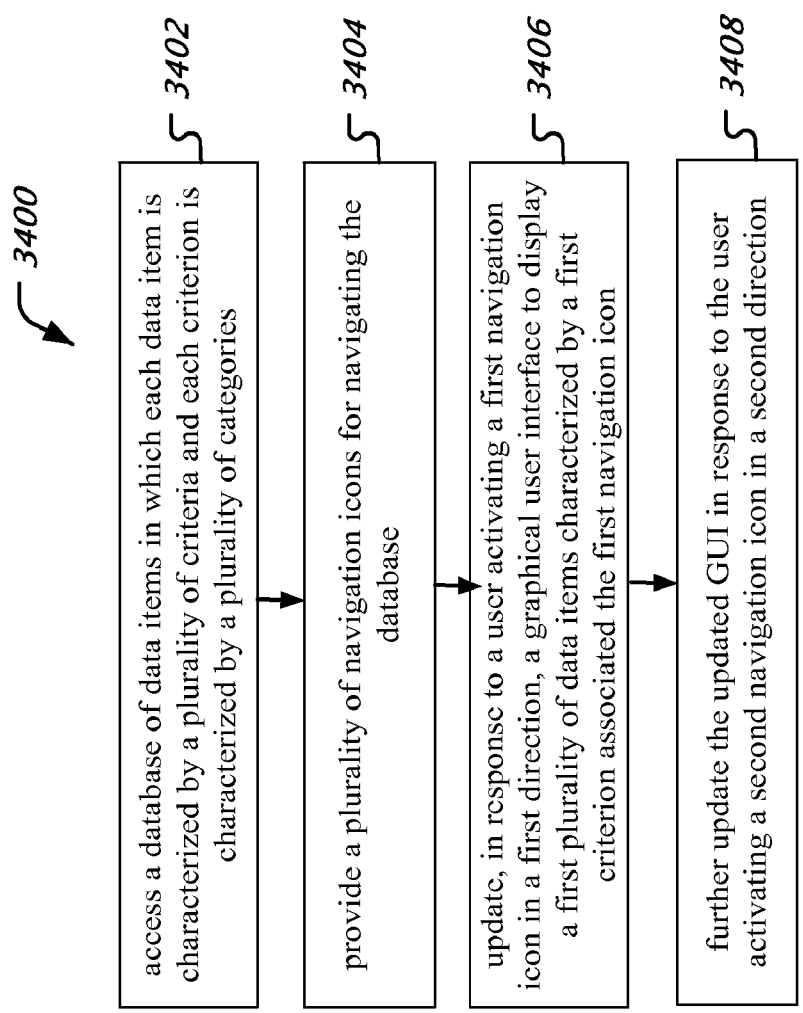
FIG. 34 is a flowchart representation of a process of navigating a database using direction-sensitive navigation control icons.

FIG. 34 is a flowchart representation of a process 3400 of database navigation using direction-sensitive navigation control icons. The process 3440 may be implemented by a user device during the browsing of data that is subject to multiple classification criteria.

At 3402, a database of data items in which each data item is characterized by a plurality of criteria and each criterion is characterized by a plurality of categories is accessed.

At 3404, a plurality of navigation icons for navigating the database are provided. Each navigation icon is associated with a criteria. For example, with reference to FIGS. 11, 12 and 14, navigation icons such as "dir" "type" "user" and "last" are provided to enable classification based browsing.

At 3406, in response to a user activating a first navigation icon in a first direction, a graphical user interface is updated to display a first plurality of data items characterized by a first criterion associated the first navigation icon. The user activation may include, e.g., a user selecting and dragging and dropping an icon on the selected data view pane. A user may accomplish the activation using a touch screen and a finger swipe or using a pointer device such as a mouse. As described with respect to FIGS. 4 to 27, a user may be able to either activate a classification in a horizontal direction or in a vertical direction, thereby causing the display to update based on the classification criterion activated by the user.

At 3408, the updated GUI is further updated in response to the user activating a second navigation icon in a second direction, to display a second plurality of data items characterized by the first criterion and a second criterions associated with the second navigation icon. For example, as described with respect to FIGS. 11 to 14, a user may first activate a navigation icon, e.g., the dir icon, to display various directories. Next, the user can activate the "last" icon, thereby resulting in the listing for "GUIkit" directory to expand in a second direction (e.g., horizontal, in the depicted example).

Figure 35:
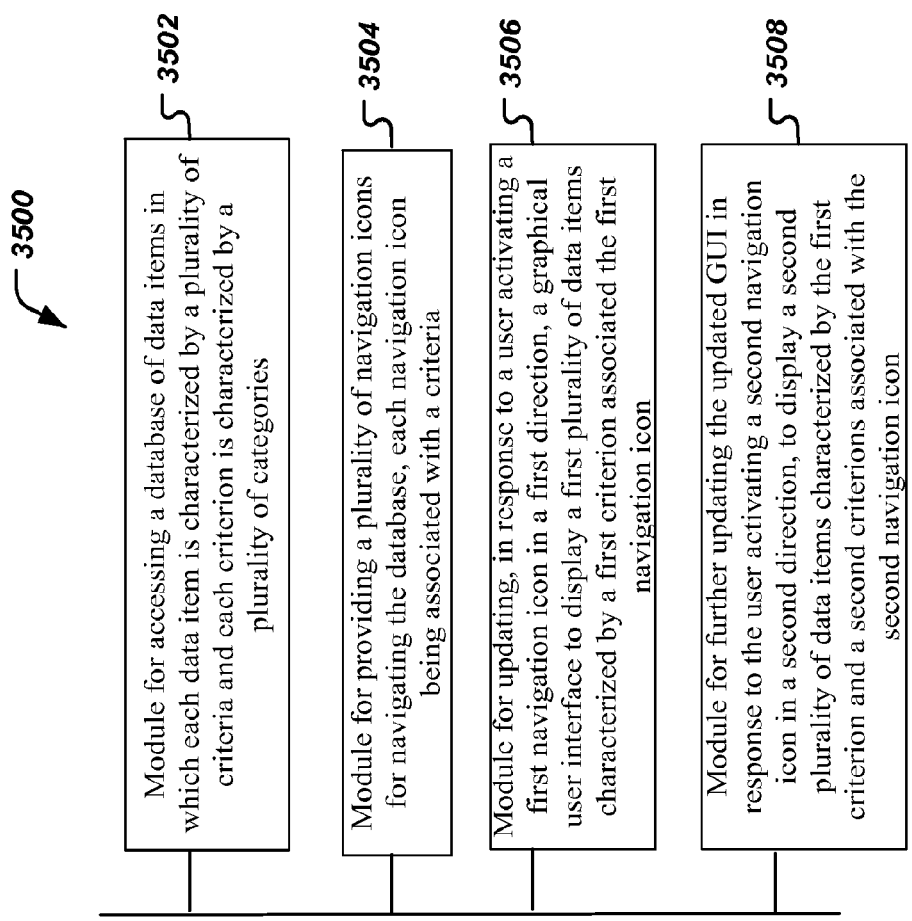
FIG. 35 is a block diagram representation of an apparatus for facilitating database navigation using direction-sensitive navigation control icons.

FIG. 35 is a block diagram representation of an apparatus 35 for navigating a database. The module 502 is for accessing a database of data items in which each data item is characterized by a plurality of criteria and each criterion is characterized by a plurality of categories. The module 3504 is for providing a plurality of navigation icons for navigating the database, each navigation icon being associated with a criteria. The module 3506 is for updating, in response to a user activating a first navigation icon in a first direction, a graphical user interface to display a first plurality of data items characterized by a first criterion associated the first navigation icon. The module 3508 is for further updating the updated GUI in response to the user activating a second navigation icon in a second direction, to display a second plurality of data items characterized by the first criterion and a second criterions associated with the second navigation icon.

Figure 36:
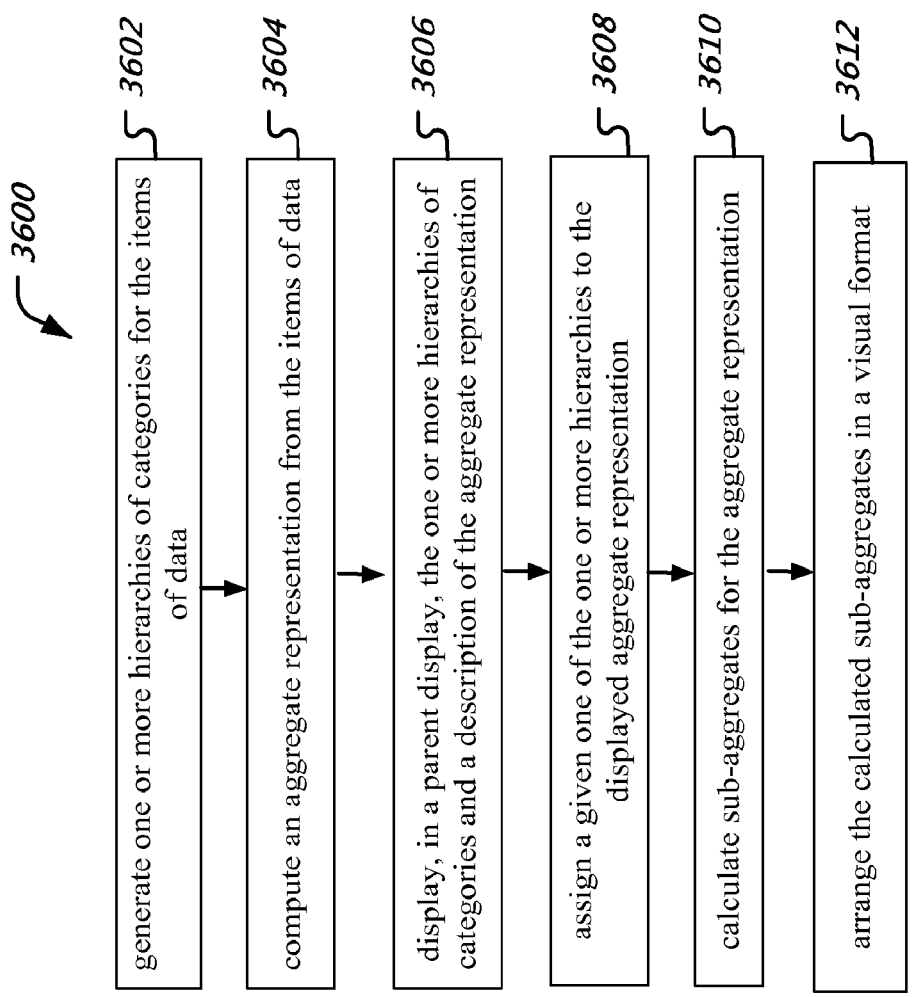
FIG. 36 is a flowchart representation of a process of enabling data browsing by a user.

FIG. 36 is a flowchart representation of a process 3600 for generating a human readable display from items of data.

At 3602, one or more hierarchies of categories are generated for the items of data.

At 3604, an aggregate representation is generated from the items of data.

At 3606, in a parent display, the one or more hierarchies of categories and a description of the aggregate representation are displayed.

At 3608, a given one of the one or more hierarchies is assigned to the displayed aggregate representation by activating a control widget corresponding to the given hierarchy on the display of the aggregate representation.

At 3610, sub-aggregates for the aggregate representation are calculated.

At 3612, the calculated sub-aggregates are arranged in a visual format by expanding the parent display to retain previously displayed information and further displaying the visual format of the calculated sub-aggregates. In some implementations, the visual format may include a rectangular array. In some implementations, other arrangements, e.g., radially around a circle, may be used. When the rectangular array is used, in some implementations, the expanding of the parent display may be performed by enlarging a cell of the rectangular array (see, e.g., examples in FIGS. 10, 11 and 19 to 24).

In some implementations, the controlling widgets may be icons which include suggestive text labels or graphics indicating of the attribute that can be accessed using the icon. Other type of controlling widgets (e.g., a list, a radio button, etc.) can also be used. When the controlling widget is activated (e.g., by a point-and-click operation or a finger swipe), the parent display may expand in a pre-specified direction. In some examples, the pre-specified direction may be such that a next direction is different from the previously expanded direction (e.g., toggle between horizontal and vertical directions). In some implementations, the directions may be orthogonal to each other (e.g., X and Y directions).

Figure 37:
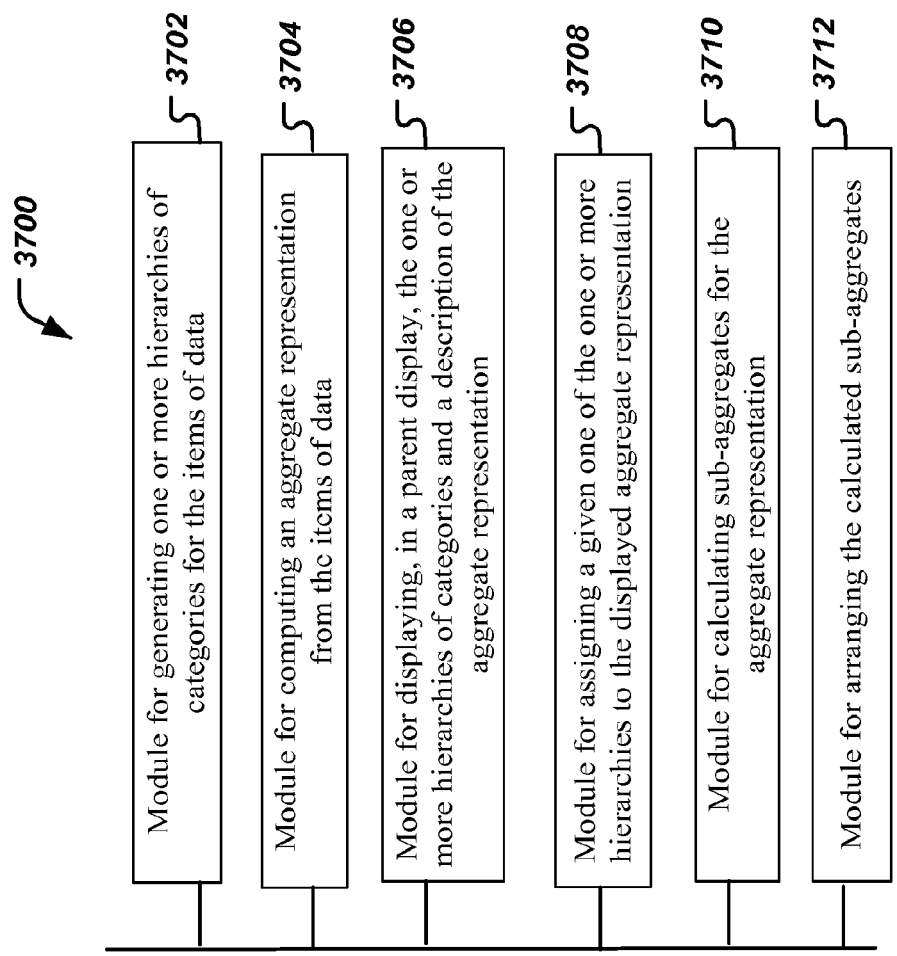
FIG. 37 is a block diagram representation of an apparatus for facilitating data browsing by a user.

FIG. 37 is a block diagram representation of an apparatus 3700 for generating a human readable display from items of data. The module 3702 is for generating one or more hierarchies of categories for the items of data. The module 3704 is for computing an aggregate representation from the items of data. The module 3706 is for displaying, in a parent display, the one or more hierarchies of categories and a description of the aggregate representation. The module 3708 is for assigning a given one of the one or more hierarchies to the displayed aggregate representation by activating a control widget corresponding to the given hierarchy on the display of the aggregate representation. The module 3710 is for calculating sub-aggregates for the aggregate representation. The module 3712 is for arranging the calculated sub-aggregates in a visual format by expanding the parent display to retain previously displayed information and further displaying the visual format of the calculated sub-aggregates In some implementations, the user input prioritization is based on a sequence in which user inputs are received so that an earlier received user input has a higher priority than a later received user input.

In some implementations, an apparatus comprises a memory that stores software instructions and items of data and a processor that executes the software instructions and implements a method for generating a human readable display from the items of data. The method includes generating one or more hierarchies of categories for the items of data, computing an aggregate representation from the items of data, displaying, in a parent display, the one or more hierarchies of categories and a description of the aggregate representation, assigning a given one of the one or more hierarchies to the displayed aggregate representation by activating a control widget corresponding to the given hierarchy on the display of the aggregate representation, calculating sub-aggregates for the aggregate representation, and arranging the calculated sub-aggregates in a visual format by expanding the parent display to retain previously displayed information and further displaying the visual format of the calculated sub-aggregates. In some implementations, the visual format is a rectangular array. In some implementations, the expanding is performed by enlarging a cell of the rectangular array. In some implementations, the activating of the controlling widget results in an expansion of the parent display in a pre-specified direction. In some implementations, a next activating of the controlling widget results in another expansion in a second direction that is orthogonal to the pre-specified direction.

One prevalent way of finding information user internet-based searching. In a typical internet search, results are ordered by a match quality factor. In another typical internet search, structured searching is used in which pre-sorted data, e.g., from a database is used to produce search results. Structured searching often tends to be a higher cost option to the search result provider because of the overhead of accumulation of data and sorting the data to facilitate search results.

Some of the above-discussed techniques combine multiple criteria and aggregate measures instead of traditional structured searching. Referring to such techniques as "multi-criterion browsing," these techniques, in one aspect, store the structure of a search. This feature advantageously can provide better browsing experience both to a user and a search engine that provides the results to the user. For example, for everyday searches such as searching for restaurants, vacation destinations, retail items, the search results may be based on human-friendly categorization (e.g., categories selected by humans for humans). Another advantageous aspect is that a multi-description can provide a structure for a more precise relationship between search criteria, compared to using multiple keywords, and can be easily linked with products. Past choices, e.g., within a price range criterion can also provide preference data of a user by calibrating against a benchmark.

One of skill in the art will also appreciate that the disclosed techniques lend themselves to scalable implementations for viewing large quantities of data. Based on the hierarchical data structuring, large scale databases could be organized in parallel. For example, 1 billion data items could be split and stored on 1,000 servers, which may be geographically in different places (and differently addressable). For example, each server may store 1 million data items. The partial tallies stored on each server can be combined using aggregate measures.

Applications that benefit from the disclosed techniques include not just internet searching but other applications such as enterprise solutions and government applications where large amount of data needs to be accessed in a distributed manner (e.g., hundreds of immigration checkpoints accessing data from various locations). Example enterprise applications include human resources, inventory management, transaction server, balance sheet items, etc.

In non-enterprise settings, such as a home user organizing his photos, music, tax returns, credit card summaries, etc., a user may be able to define search criteria by which he can browse through a data-base that is organized according to a user's multi-criteria.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is what is described and illustrated, including:

1. A method of displaying to a user, hierarchical data having a plurality of data items, the method comprising:

associating a first classification attribute from a first attribute group and a second classification attribute from a second attribute group with each data item of a plurality of data items, wherein the second attribute group is arranged as a directed graph;

providing a user interface to include a display area which includes a first control widget representative of the first attribute group and a second control widget representative of the second attribute group;

displaying, within the display area and in a first dimension, a measure based on a first portion of the plurality of data items in response to the user activating the first control widget, wherein the measure is based on classification attributes of the first portion of the plurality of data items; and displaying, within the display area and in a second dimension, the measure based on a second portion of the plurality of data items in response to the user activating the second control widget, wherein the user activating the second control widget in a first direction of the first and second dimensions displays the measure based on a breakdown of the second attribute group, wherein the breakdown is based on one or more child vertices of the directed graph arrangement of the second attribute group.

2. The method of claim 1, further comprising:
receiving user activations in the display area, the user activations indicating which of the plurality of data items to hide from view; and
hiding the selected plurality of data items from the display area.

3. The method of claim 1, wherein the measure comprises a number of data items in the first portion of the plurality of data items.

4. The method of claim 1, wherein the user activating the first control widget comprises the user dragging and dropping the first control widget on the display area.

5. The method of claim 1, wherein the user activating the first control widget comprises the user finger swiping the first control widget on the display area.

6. The method of claim 1, further comprising:
consecutively displaying, a number of times and within the display area, the measure based on repeated breakdowns of the second attribute group,
wherein the consecutively displaying is in response to receiving one or more additional user activations of the second control widget in the first direction,
wherein the number of times is based on a minimum of (a) a number of the one or more additional user activations, and (b) a number of breakdowns that can be performed, based on a current display of the measure, on the directed graph arrangement of the second attribute group until at least one child vertex that is a leaf is reached.

7. The method of claim 1, wherein the user activating the second control widget in a second direction of the first and second dimensions displays the measure based on an aggregation of the second attribute group, and wherein the aggregation is based on one or more parent vertices of the directed graph arrangement of the second attribute group.

8. The method of claim 7, wherein the first direction of the first and second dimensions is down and right, respectively, and wherein the second direction of the first and second dimensions is up and left, respectively.

9. The method of claim 7, further comprising:
consecutively displaying, a number of times and within the display area, the measure based on repeated aggregations of the second attribute group,
wherein the consecutively displaying is in response to receiving one or more additional user activations of the second control widget in the second direction,
wherein the number of times is based on a minimum of (a) a number of the one or more additional user activations, and (b) a number of aggregations that can be performed, based on a current display of the measure, on the directed graph arrangement of the second attribute group until a root vertex is reached.

10. An apparatus, comprising a processor, for displaying hierarchical data to a user, the hierarchical data comprising a plurality of data items, the processor configured to implement a method, the method comprising:
associating a first classification attribute from a first attribute group and a second classification attribute from a second attribute group with each data item, wherein the second attribute group is arranged as a directed graph;
providing a user interface comprising:
a display area including a first control widget representative of the first attribute group and a second control widget representative of the second attribute group,
wherein a measure based on a first portion of the plurality of data items can be displayed within the display area and in a first dimension, and in response to the user activating the first control widget, wherein the measure is based on the classification attributes of the first portion of the plurality of data items,
wherein the measure based on a second portion of the plurality of data items can be displayed within the display area and in a second dimension, and in response to the user activating the second control widget,
wherein the user activating the second control widget in a first direction of the first and second dimensions displays the measure based on a breakdown of the second attribute group, wherein the breakdown is based on one or more child vertices of the directed graph arrangement of the second attribute group.

11. The apparatus of claim 10, the method further comprising:
receiving user activations in the display area, the user activations indicating which of the plurality of data items to hide from view; and
hiding the selected plurality of data items from the display area.

12. The apparatus of claim 10, wherein the measure comprises a number of data items in the first portion of the plurality of data items.

13. The apparatus of claim 10, wherein the user activating the first control widget comprises the user dragging and dropping the first control widget on the display area.

14. The apparatus of claim 10, wherein the user activating the first control widget comprises the user finger swiping the first control widget on the display area.

15. The apparatus of claim 10, further comprising:
consecutively displaying, a number of times and within the display area, the measure based on repeated breakdowns of the second attribute group,
wherein the consecutively displaying is in response to receiving one or more additional user activations of the second control widget in the first direction, wherein the number of times is based on a minimum of (a) a number of the one or more additional user activations, and (b) a number of breakdowns that can be performed, based on a current display of the measure, on the directed graph arrangement of the second attribute group until at least one child vertex that is a leaf is reached.

16. The apparatus of claim 10, wherein the user activating the second control widget in a second direction of the first and second dimensions displays the measure based on an aggregation of the second attribute group, and wherein the aggregation is based on one or more parent vertices of the directed graph arrangement of the second attribute group.

17. The apparatus of claim 16, wherein the first direction of the first and second dimensions is down and right, respectively, and wherein the second direction of the first and second dimensions is up and left, respectively.

18. The apparatus of claim 16, further comprising:
consecutively displaying, a number of times and within the display area, the measure based on repeated aggregations of the second attribute group,
wherein the consecutively displaying is in response to receiving one or more additional user activations of the second control widget in the second direction,
wherein the number of times is based on a minimum of (a) a number of the one or more additional user activations, and (b) a number of aggregations that can be performed, based on a current display of the measure, on the directed graph arrangement of the second attribute group until a root vertex is reached.

19. A computer program product comprising a non-transitory computer-readable storage medium having code stored thereon, the code, when executed by a processor, causing the processor to implement a method of displaying hierarchical data to a user, the hierarchical data comprising a plurality of data items, the method comprising:
associating a first classification attribute from a first attribute group and a second classification attribute from a second attribute group with each data item, wherein the second attribute group is arranged as a directed graph;
providing a user interface comprising:
a display area including a first control widget representative of the first attribute group and a second control widget representative of the second attribute group,
wherein a measure based on a first portion of the plurality of data items can be displayed within the display area and in a first dimension, and in response to the user activating the first control widget, wherein the measure is based on the classification attributes of the first portion of the plurality of data items,
wherein the measure based on a second portion of the plurality of data items can be displayed within the display area and in a second dimension, and in response to the user activating the second control widget,
wherein the user activating the second control widget in a first direction of the first and second dimensions displays the measure based on a breakdown of the second attribute group, wherein the breakdown is based on one or more child vertices of the directed graph arrangement of the second attribute group.

20. The computer program product of claim 19, wherein the method further comprises:
receiving user activations in the display area, the user activations indicating which of the plurality of data items to hide from view; and
hiding the selected plurality of data items from the display area.

21. The computer program product of claim 19, wherein the measure comprises a number of data items in the first portion of the plurality of data items.

22. The computer program product of claim 19, wherein the user activating the first control widget comprises the user dragging and dropping the first control widget on the display area.

23. The computer program product of claim 19, wherein the user activating the first control widget comprises the user finger swiping the first control widget on the display area.

24. The computer program product of claim 19, wherein the method further comprises:
consecutively displaying, a number of times and within the display area, the measure based on repeated breakdowns of the second attribute group,
wherein the consecutively displaying is in response to receiving one or more additional user activations of the second control widget in the first direction,
wherein the number of times is based on a minimum of (a) a number of the one or more additional user activations, and (b) a number of breakdowns that can be performed, based on a current display of the measure, on the directed graph arrangement of the second attribute group until at least one child vertex that is a leaf is reached.

25. The computer program product of claim 19, wherein the user activating the second control widget in a second direction of the first and second dimensions displays the measure based on an aggregation of the second attribute group, and wherein the aggregation is based on one or more parent vertices of the directed graph arrangement of the second attribute group.

26. The method of claim 25, wherein the first direction of the first and second dimensions is down and right, respectively, and wherein the second direction of the first and second dimensions is up and left, respectively.

27. The method of claim 25, further comprising:
consecutively displaying, a number of times and within the display area, the measure based on repeated aggregations of the second attribute group,
wherein the consecutively displaying is in response to receiving one or more additional user activations of the second control widget in the second direction,
wherein the number of times is based on a minimum of (a) a number of the one or more additional user activations, and (b) a number of aggregations that can be performed, based on a current display of the measure, on the directed graph arrangement of the second attribute group until a root vertex is reached.

* * * * *